US012197237B2

(12) United States Patent
Yoshinaga et al.

(10) Patent No.: US 12,197,237 B2
(45) Date of Patent: Jan. 14, 2025

(54) MANAGEMENT SYSTEM, MANAGEMENT METHOD, AND STORAGE MEDIUM

(71) Applicant: DENSO CORPORATION, Kariya (JP)

(72) Inventors: Satoshi Yoshinaga, Kariya (JP); Yasuhiro Hirayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 331 days.

(21) Appl. No.: 17/660,924

(22) Filed: Apr. 27, 2022

(65) Prior Publication Data

US 2022/0250651 A1 Aug. 11, 2022

Related U.S. Application Data

(63) Continuation of application No. PCT/JP2020/038492, filed on Oct. 12, 2020.

(30) Foreign Application Priority Data

Oct. 29, 2019 (JP) .................. 2019-196062

(51) Int. Cl.
  *G05D 1/227* (2024.01)
  *B60W 60/00* (2020.01)
  (Continued)

(52) U.S. Cl.
  CPC ....... *G05D 1/2274* (2024.01); *B60W 60/0015* (2020.02); *B60W 60/0018* (2020.02);
  (Continued)

(58) Field of Classification Search
  CPC . G05D 1/2274; G05D 1/226; B60W 60/0015; B60W 60/0018;
  (Continued)

(56) References Cited

U.S. PATENT DOCUMENTS 9,507,346 B1 * 11/2016 Levinson .............. B60W 30/09
2015/0266489 A1 * 9/2015 Solyom ................ B60W 10/04
 701/23

(Continued)

FOREIGN PATENT DOCUMENTS

JP 2018-538647 A 12/2018

*Primary Examiner* — Dale W Hilgendorf
(74) *Attorney, Agent, or Firm* — Maschoff Brennan

(57) ABSTRACT

A management system is provided in which an autonomous driving assistance center periodically communicates with an autonomous vehicle to manage a vehicle state of the autonomous vehicle. The system includes a vehicle side device provided to the autonomous vehicle and including a vehicle side determination unit that determines, when communication with the autonomous driving assistance center is disconnected, whether to continue autonomous traveling, based on communication situation information that indicates a situation of communication between the autonomous driving assistance center and the autonomous vehicle at each place, where the autonomous vehicle is allowed to travel, in a management target area of the management system, and a center side device provided to the autonomous driving assistance center and including a center side determination unit that determines, when the communication with the autonomous vehicle is disconnected, whether to notify an assistant assisting the autonomous vehicle, based on the communication situation information.

22 Claims, 23 Drawing Sheets

(51) Int. Cl.
  *G05D 1/226* (2024.01)
  *G08G 1/01* (2006.01)
  *G08G 1/09* (2006.01)
  *G08G 1/0967* (2006.01)

(52) U.S. Cl.
  CPC ....... *B60W 60/00184* (2020.02); *G05D 1/226* (2024.01); *G08G 1/09* (2013.01); *G08G 1/096725* (2013.01); *B60W 2552/53* (2020.02); *B60W 2556/45* (2020.02); *B60W 2720/10* (2013.01); *G08G 1/01* (2013.01)

(58) Field of Classification Search
  CPC ....... B60W 60/00184; B60W 2552/53; B60W 2556/45; B60W 2720/10; G08G 1/09; G08G 1/096725; G08G 1/01
  See application file for complete search history.

(56) References Cited

U.S. PATENT DOCUMENTS

| | | | |
|---|---|---|---|
| 2016/0305787 A1* | 10/2016 | Sato | G08G 1/096844 |
| 2018/0231977 A1* | 8/2018 | Uno | B60W 10/20 |
| 2018/0231982 A1* | 8/2018 | Yunoki | G05D 1/0274 |
| 2018/0299285 A1* | 10/2018 | Morita | G01C 21/3492 |
| 2019/0137999 A1* | 5/2019 | Taguchi | G05D 1/249 |
| 2020/0158531 A1* | 5/2020 | Takeuchi | G01C 21/38 |
| 2020/0221349 A1* | 7/2020 | Nakata | H04W 4/44 |
| 2022/0242447 A1* | 8/2022 | Nagura | B60W 50/0098 |

* cited by examiner

FIG.3

COMMUNICATION SITUATION INFORMATION DATABASE

| LOCATION INFORMATION | COMMUNICATION RELATED INFORMATION | |
|---|---|---|
| | COMMUNICATION DATE AND TIME INFORMATION | GEOGRAPHICAL COMMUNICATION INFORMATION |
| K001 | ○YEAR □MONTH △DAY 4h 0min. 0sec. | NORMAL |
| | ○YEAR □MONTH △DAY 4h 0min. 2sec. | |
| | ⋮ | |
| ⋮ | ⋮ | ⋮ |
| K00N | ⋮ | UNSTABLE |
| | ⋮ | ⋮ |

COMMUNICATION DISCONNECTION OCCURRENCE TIME : 12:34:00

MANAGEMENT SYSTEM, MANAGEMENT METHOD, AND STORAGE MEDIUM

CROSS-REFERENCE TO RELATED APPLICATION

The present application is based on and claims the benefit of priority from earlier Japanese Patent Application No. 2019-196062 filed Oct. 29, 2019, the description of which is incorporated herein by reference.

BACKGROUND

Technical Field

The present disclosure relates to a management system, a management method, and a storage medium.

Related Art

Remote monitoring systems are proposed which are configured by autonomous vehicles and a remote monitoring center that communicates with the autonomous vehicles via a network.

SUMMARY

As an aspect of the present disclosure, a management system is provided in which an autonomous driving assistance center periodically communicates with an autonomous vehicle, which is automatically driven, to manage a vehicle state of the autonomous vehicle. The system includes: a vehicle side device provided to the autonomous vehicle and including a vehicle side determination unit that determines, when communication with the autonomous driving assistance center is disconnected, whether to continue autonomous traveling, based on communication situation information that indicates a situation of communication between the autonomous driving assistance center and the autonomous vehicle at each place, where the autonomous vehicle is allowed to travel, in a management target area of the management system; and a center side device provided to the autonomous driving assistance center and including a center side determination unit that determines, when the communication with the autonomous vehicle is disconnected, whether to notify an assistant assisting the autonomous vehicle, based on the communication situation information. The vehicle side determination unit derives a vehicle side expected period, which is a period within which disconnected communication is expected to be restored, based on a traveling route of the autonomous vehicle to which the vehicle side determination unit is provided and the communication situation information. If the derived vehicle side expected period is a predetermined period or less, the vehicle side determination unit determines to continue the autonomous traveling.

BRIEF DESCRIPTION OF THE DRAWINGS

In the accompanying drawings:

FIG. 3 is a schematic diagram illustrating an example of a configuration of a communication situation information database according to the embodiments;

DETAILED DESCRIPTION OF THE PREFERRED EMBODIMENTS

Remote monitoring systems are proposed which are configured by autonomous vehicles and a remote monitoring center that communicates with the autonomous vehicles via a network (refer to JP 2019-87015 A).

The remote monitoring system performs the following control. When communication between an autonomous vehicle and the remote monitoring center is disconnected, the remote monitoring system automatically stops the autonomous vehicle and transmits images captured by a camera to the remote monitoring center. After the autonomous vehicle is automatically stopped, when the remote monitoring system receives a start signal from the remote monitoring center, the remote monitoring system restarts traveling of the autonomous vehicle.

In addition, according to the remote monitoring system, when the autonomous vehicle is automatically stopped, the remote monitoring center determines whether the autonomous vehicle is allowed to restart traveling based on the received images captured by the camera. If determining that the autonomous vehicle is allowed to restart traveling, the remote monitoring center transmits a start signal to the autonomous vehicle.

Detailed studies by the inventor found a problem that according to the technique disclosed in JP 2019-87015 A, since the autonomous vehicle is stopped every time communication between the autonomous vehicle and the remote monitoring center is disconnected, continuity of an autonomous driving assistance service is reduced.

The inventor also found that since the technique disclosed in JP 2019-87015 A notifies an assistant, such as an operator or a local staff, who assists the autonomous vehicle in the autonomous driving assistance service, every time communication between the autonomous vehicle and the remote monitoring center is disconnected, the cost of the service increases.

The present disclosure provides a management system, a management method, and a storage medium that can prevent continuity of an autonomous driving assistance service from being reduced and prevent the cost of the autonomous driving assistance service from increasing.

Hereinafter, embodiments for implementing techniques of the present disclosure will be described in detail with reference to the drawings.

First Embodiment

Figure 1:
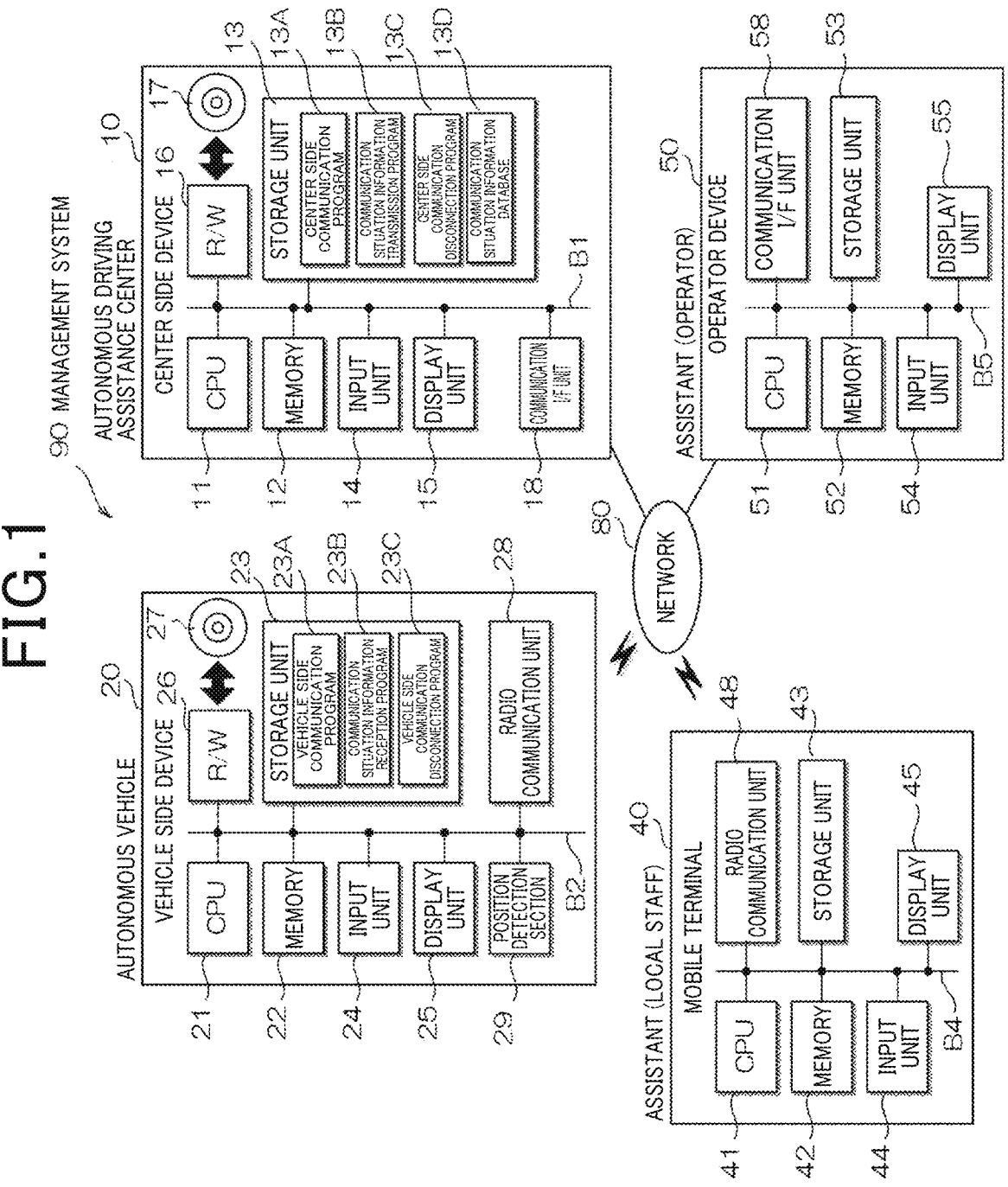
FIG. 1 is a block diagram illustrating an example of a hardware configuration of a management system according to first to third embodiments.

First, with reference to FIG. 1 and FIG. 2, a configuration of a management system 90 according to the present embodiment will be described. In the management system 90 according to the present embodiment, an autonomous driving assistance center periodically communicates with an autonomous vehicle that is automatically driven to manage a vehicle state of the autonomous vehicle. As an example, as illustrated in FIG. 1, the management system 90 includes a center side device 10, a plurality of vehicle side devices 20, a plurality of mobile terminals 40, and an operator device 50, which are accessible to a network 80. Examples of the center side device 10, the vehicle side devices 20, and the operator device 50 are general-purpose information processors such as personal computers and server computers. An example of the mobile terminal 40 is a portable and wireless terminal such as a smartphone, a tablet terminal, a personal digital assistant (PDA), a notebook personal computer.

The center side device 10 according to the present embodiment is managed by the autonomous driving assistance center that operates the management system 90. The center side device 10 includes a central processing unit (CPU) 11 (computer), a memory 12 (storage medium) as a temporary storage area, a non-volatility storage unit 13, an input unit 14 such as a keyboard and a mouse, a display unit 15 such as a liquid crystal display, a medium reading and writing (R/W) unit 16, and a communication interface (I/F) unit 18. The CPU 11, the memory 12, the storage unit 13, the input unit 14, the display unit 15, the medium reading and writing unit 16, and the communication I/F unit 18 are connected to one another via a bus B1. The medium reading and writing unit 16 reads information written in a recording medium 17 and writes information in the recording medium 17.

The storage unit 13 is implemented by a hard disk drive (HDD), a solid state drive (SSD), a flash memory, or the like. The storage unit 13 as a memory medium (storage medium) stores a center side communication program 13A, a communication situation information transmission program 13B, and a center side communication disconnection program 13C. The center side communication program 13A, the communication situation information transmission program 13B, and the center side communication disconnection program 13C are stored in the storage unit 13 in such a manner that the recording medium 17, in which the center side communication program 13A, the communication situation information transmission program 13B, and the center side communication disconnection program 13C are stored, is set in the medium reading and writing unit 16, and the medium reading and writing unit 16 reads the center side communication program 13A, the communication situation information transmission program 13B, and the center side communication disconnection program 13C from the recording medium 17. The CPU 11 reads the center side communication program 13A, the communication situation information transmission program 13B, and the center side communication disconnection program 13C from the storage unit 13 and loads them in the memory 12 to sequentially perform processes respectively included in the center side communication program 13A, the communication situation information transmission program 13B, and the center side communication disconnection program 13C.

The storage unit 13 stores a communication situation information database 13D. The communication situation information database 13D will be described later in detail.

The vehicle side devices 20 are installed in respective autonomous vehicles utilizing an autonomous driving assistance service. Each of the vehicle side devices 20 includes a CPU 21 (computer), a memory 22 (storage medium) as a temporary storage area, a non-volatility storage unit 23, an input unit 24 such as a keyboard and a mouse, a display unit 25 such as a liquid crystal display, a medium reading and writing unit 26, a radio communication unit 28, and a position detection section 29. The CPU 21, the memory 22, the storage unit 23, the input unit 24, the display unit 25, the medium reading and writing unit 26, the radio communication unit 28, and the position detection section 29 are connected to one another via a bus B2. The medium reading and writing unit 26 reads information written in a recording medium 27 and writes information in the recording medium 27.

The storage unit 23 is implemented by an HDD, an SSD, a flash memory, or the like. The storage unit 23 as a storage medium stores a vehicle side communication program 23A, a communication situation information reception program 23B, and a vehicle side communication disconnection program 23C. The vehicle side communication program 23A, the communication situation information reception program 23B, and the vehicle side communication disconnection program 23C are stored in the storage unit 23 in such a manner that the recording medium 27, in which the vehicle side communication program 23A, the communication situation information reception program 23B, and the vehicle side communication disconnection program 23C are stored, is set in the medium reading and writing unit 26, and the medium reading and writing unit 26 reads the vehicle side communication program 23A, the communication situation information reception program 23B, and the vehicle side communication disconnection program 23C from the recording medium 27. The CPU 21 reads the vehicle side communication program 23A, the communication situation information reception program 23B, and the vehicle side communication disconnection program 23C from the storage unit 23 and loads them in the memory 22 to sequentially perform processes respectively included in the vehicle side communication program 23A, the communication situation information reception program 23B, and the vehicle side communication disconnection program 23C.

The position detection section 29 detects a position of an autonomous vehicle in which the position detection section 29 is installed. Although a global positioning system (GPS) device is applied to the present embodiment, this is not a limitation. Any devices that can detect a position thereof may be applied as the position detection section 29.

The mobile terminal 40 according to the present embodiment is carried by a local staff assigned to each place in a management target area of the management system 90. The mobile terminal 40 includes a CPU 41 (computer), a memory 42 (storage medium) as a temporary storage area, a non-volatility storage unit 43, an input unit 44 such as a touch panel, a display unit 45 such as a liquid crystal display, and a radio communication unit 48. The CPU 41, the memory 42, the storage unit 43, the input unit 44, the display unit 45, and the radio communication unit 48 are connected to one another via a bus B4. The storage unit 43 is implemented by an HDD, an SSD, a flash memory or the like.

The operator device 50 according to the present embodiment is operated by an operator, who is a staff performing various services included in the autonomous driving assistance service. The operator device 50 includes a CPU 51 (computer), a memory 52 (storage medium) as a temporary storage area, a non-volatility storage unit 53, an input unit 54 such as a keyboard and a mouse, a display unit 55 such as a liquid crystal display, and a communication I/F unit 58. The CPU 51, the memory 52, the storage unit 53, the input unit 54, the display unit 55, and the communication I/F unit 58 are connected to one another via a bus B5. The storage unit 53 is implemented by an HDD, an SSD, a flash memory or the like.

Since the local staff and the operator provide assistance to autonomous vehicles, hereinafter, they are collectively referred to as assistants.

Next, with reference to FIG. 2, functional configurations of the devices included in the management system 90 according to the present embodiment will be described.

Figure 2:
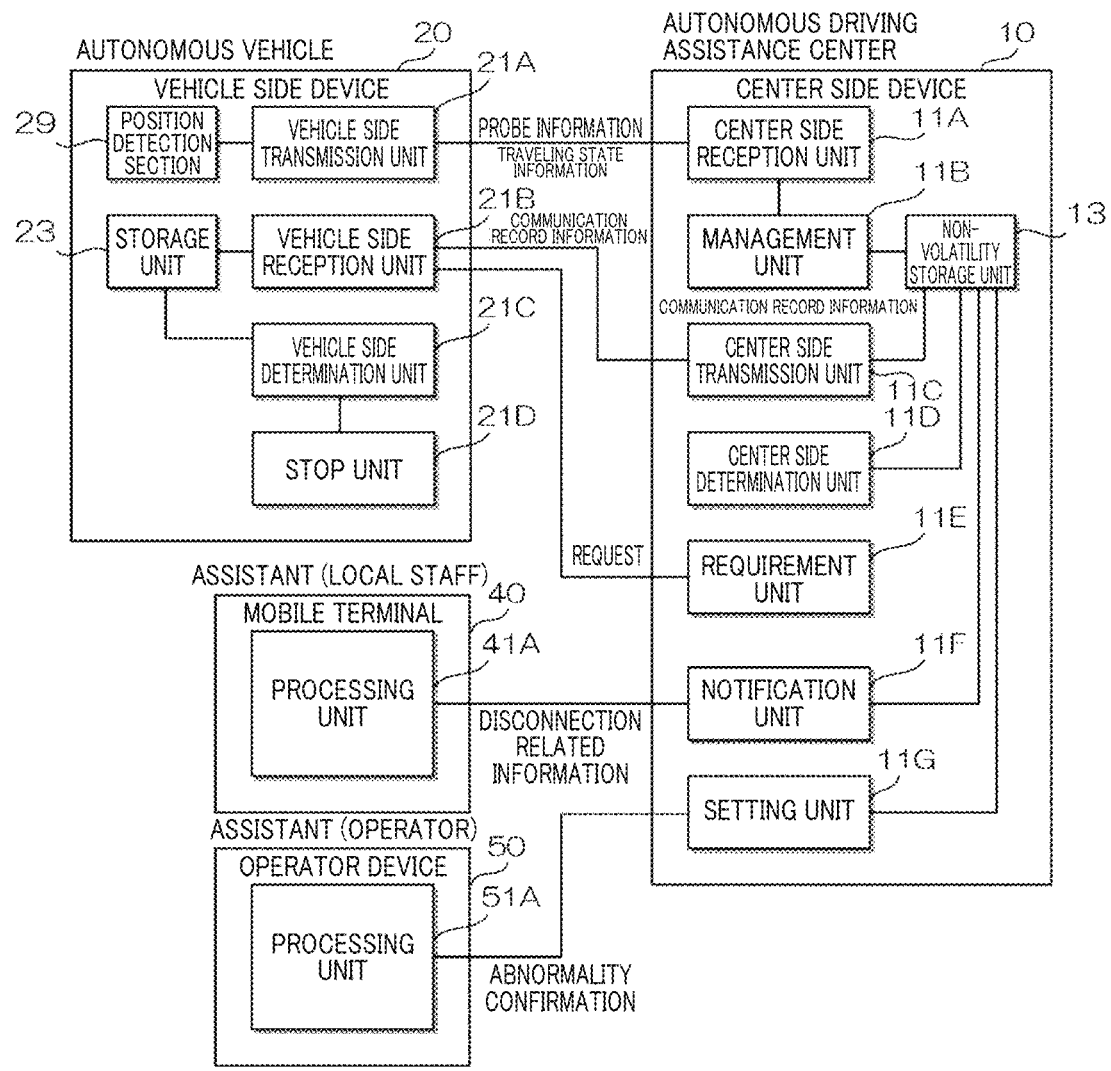
FIG. 2 is a block diagram illustrating an example of a functional configuration of the management system according to the first to third embodiments.

As illustrated in FIG. 2, the center side device 10 according to the present embodiment includes a center side reception unit 11A, a management unit 11B, a center side transmission unit 11C, a center side determination unit 11D, a requirement unit 11E, a notification unit 11F, and a setting unit 11G. The CPU 11 of the center side device 10 executes the center side communication program 13A, the communication situation information transmission program 13B, and the center side communication disconnection program 13C to function as the center side reception unit 11A, the management unit 11B, the center side transmission unit 11C, the center side determination unit 11D, the requirement unit 11E, the notification unit 11F, and the setting unit 11G.

The vehicle side device 20 according to the present embodiment includes a vehicle side transmission unit 21A, a vehicle side reception unit 21B, a vehicle side determination unit 21C, and a stop unit 21D. The CPU 21 of the vehicle side device 20 executes the vehicle side communication program 23A, the communication situation information reception program 23B, and the vehicle side communication disconnection program 23C to function as the vehicle side transmission unit 21A, the vehicle side reception unit 21B, the vehicle side determination unit 21C, and the stop unit 21D.

When communication with the autonomous driving assistance center is disconnected, the vehicle side determination unit 21C according to the present embodiment determines whether to continue autonomous traveling, based on communication situation information that indicates a situation of communication between the autonomous driving assistance center and an autonomous vehicle at each place, where the autonomous vehicle can travel, in the management target area of the management system 90.

In contrast, when communication with the autonomous vehicle is disconnected, the center side determination unit 11D according to the present embodiment determines whether to notify an assistant assisting the autonomous vehicle, based on the communication situation information.

In the autonomous driving assistance service according to the present embodiment, communication is performed between the center side device 10 and the vehicle side device 20 at predetermined intervals (e.g., 0.5 minutes) continuously. The state in which the communication performed at the predetermined intervals is disconnected predetermined number of times (e.g., ten times) or more continuously is defined as a state in which the communication is disconnected. Instead of this, the state in which although the communication between the center side device 10 and the vehicle side device 20 is continuously performed, a delay of a predetermined period (e.g., three seconds) or more occurring in the time period from transmission to reception may be defined as a state in which communication is disconnected. The state in which received information is missing may also be defined as a state in which communication is disconnected.

The vehicle side transmission unit 21A according to the present embodiment transmits probe information including location information (in the present embodiment, information on latitude and longitude) and time information. The location information indicates a location (traveling location) at which an autonomous vehicle to which the unit 21A is provided is traveling. The time information indicates the time (current time) at which the autonomous vehicle is at the location. In the present embodiment, the location information is obtained from the position detection section 29. In the present embodiment, the time information is obtained from a clock unit included in the CPU 21. Although the probe information includes both of the location information and the time information in the present embodiment, the time information may not necessarily be included in the probe information.

In contrast, the center side reception unit 11A according to the present embodiment receives probe information transmitted from the vehicle side transmission unit 21A. The management unit 11B manages location information, which is included in the probe information received by the center side reception unit 11A, as communication record information indicating success in communication. The center side transmission unit 11C according to the present embodiment transmits the communication record information managed by the management unit 11B to the vehicle side device 20.

In the present embodiment, the communication situation information includes the communication record information. Thus, the vehicle side determination unit 21C can determine whether to continue autonomous traveling by using the communication record information. The center side determination unit 11D also can determine whether to notify an assistant by using the communication record information.

In the present embodiment, the communication situation information includes unstable area information that indicates an area that can be determined from geographical information in the management target area of the management system 90 and in which communication is unstable between the autonomous driving assistance center and the autonomous vehicle. Hence, the vehicle side determination unit 21C can determine whether to continue autonomous traveling by using also the unstable area information. The center side determination unit 11D also can determine whether to notify an assistant by using also the unstable area information.

The vehicle side determination unit 21C according to the present embodiment derives a vehicle side expected period, which is a period within which disconnected communication is expected to be restored, based on a traveling route of the autonomous vehicle to which the vehicle side determination unit 21C is provided and the communication situation information. If the derived vehicle side expected period is a predetermined period or less, the vehicle side determination unit 21C determines to continue the autonomous traveling. In the present embodiment, as the predetermined period, a period derived from past record information is applied assuming that no problem occurs within the period even if the autonomous traveling is continued. For example, the above period may be preset by, for example, an operator of the center side device 10, depending on the cost that can be expended by a local staff in the autonomous driving assistance service, continuity required for the autonomous driving assistance service, or the like.

When autonomous traveling is continued in a state in which communication with the center side device 10 is disconnected, and the communication is not restored even when the vehicle has reached a point (location) where restoration of the communication is expected (restoration expected point (location)), the stop unit 21D according to the present embodiment stops the autonomous traveling.

The center side determination unit 11D according to the present embodiment derives a center side expected period, which is a period within which disconnected communication is expected to be restored, based on a traveling route of the autonomous vehicle on which the communication is disconnected and the communication situation information. If the derived center side expected period is a predetermined period or less, the center side determination unit 11D determines not to notify an assistant. When the communication with the autonomous vehicle is not restored even if the center side expected period has elapsed, the center side determination unit 11D according to the present embodiment determines to notify an assistant.

When the center side determination unit 11D determines not to notify an assistant, and thereafter determines to notify an assistant, the notification unit 11F according to the present embodiment notifies the assistant of disconnection related information including a point (location) where the communication with the autonomous vehicle is disconnected and a path that is considered that the autonomous vehicle has traveled thereon during the period during which the communication is disconnected. As described above, in the present embodiment, as the disconnection related information of which an assistant is notified, information is applied which includes a point where the communication with the autonomous vehicle is disconnected and a path that is considered that the autonomous vehicle has traveled thereon during the period during which the communication is disconnected. However, this is not a limitation. As the disconnection related information of which an assistant is notified, information including any one of a point where the communication with the autonomous vehicle is disconnected and a path that is considered that the autonomous vehicle has traveled thereon during the period during which the communication is disconnected may be applied.

When the disconnected communication with the autonomous vehicle is restored, the requirement unit 11E according to the present embodiment requests the autonomous vehicle to transmit traveling state information indicating a traveling state of the autonomous vehicle during the period during which the communication is disconnected. In response to the request, the autonomous vehicle transmits the traveling state information to the center side device 10.

The setting unit 11G according to the present embodiment causes an assistant to confirm whether the traveling state indicated by the traveling state information obtained from the autonomous vehicle in response to the request by the requirement unit 11E is abnormal. If the traveling state is not abnormal, the setting unit 11G incorporates a communication disconnection section, in which the autonomous vehicle has traveled during the period during which the communication is disconnected, into the unstable area information indicating an area in which communication is unstable between the autonomous driving assistance center and the autonomous vehicle.

The mobile terminal 40 according to the present embodiment includes a processing unit 41A. The operator device 50 includes a processing unit 51A. The CPU 41 of the mobile terminal 40 executes a program previously stored in the storage unit 43 to function as the processing unit 41A. The CPU 51 of the operator device 50 executes a program previously stored in the storage unit 53 to function as the processing unit 51A.

Next, with reference to FIG. 3, the communication situation information database 13D according to the present embodiment will be described.

As illustrated in FIG. 3, the communication situation information database 13D stores communication related information indicating communication situations at locations indicated by the corresponding location information indicating respective locations in the management target area of the management system 90. In the management system 90 according to the present embodiment, the management target area of the management system 90 is shown in plan view, and the planarly viewed management target area is divided into a plurality of divided areas, which have predetermined shape and size, in a matrix shape. In the management system 90 according to the present embodiment, the location information, which indicates locations of the respective divided areas (in the present embodiment, the center location of the divided area in a plan view) and is associated with the corresponding communication related information (in the present embodiment, communication date and time (date/time) information and geographical communication information), is stored. In the present embodiment, a square is used as a shape of the divided area, and 20 m*20 m is used as the size. Needless to say, the shape and size are not limited.

In the management system 90 according to the present embodiment, assuming that communication with an autonomous vehicle can be favorably performed at a location indicated by the location information included in the probe information received by the center side reception unit 11A from the autonomous vehicle, the time information, which is included in the probe information and is associated with the corresponding location information, is stored as the communication date/time information. If the time information is not included in the probe information, at the timing at which the center side device 10 receives the probe information, the time information indicating the current time may be obtained from a clock unit included in the CPU 11 of the center side device 10 and be used.

Figure 4:
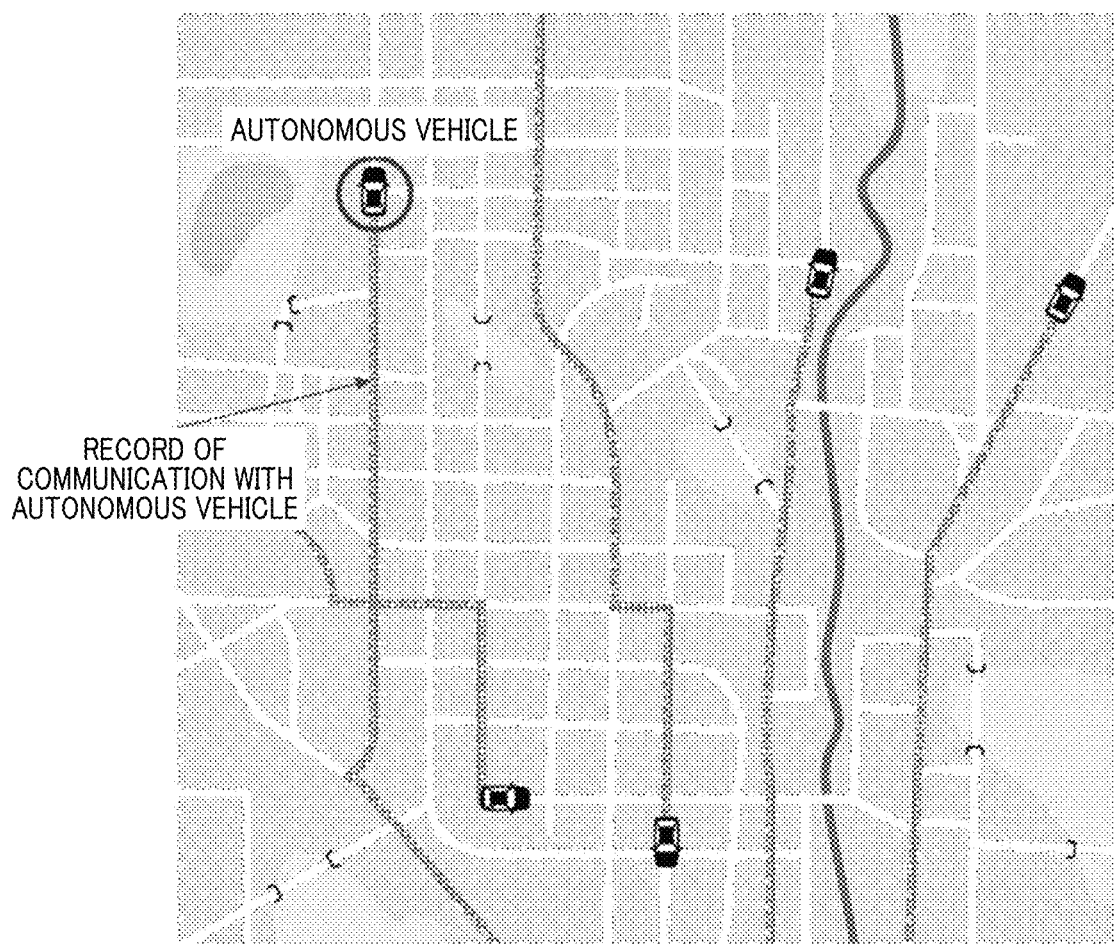
FIG. 4 is a plan view for describing communication record information included in the communication situation information database according to the embodiments.

Hence, as illustrated in FIG. 4 as an example, referring to the combination of the communication date/time information and the location information, the communication record between the center side device 10 and the vehicle side device 20 can be obtained in a state in which an autonomous vehicle is traveling. The combination of the location information and the communication date/time information in the communication situation information database 13D corresponds to the communication record information described above.

Figure 5:
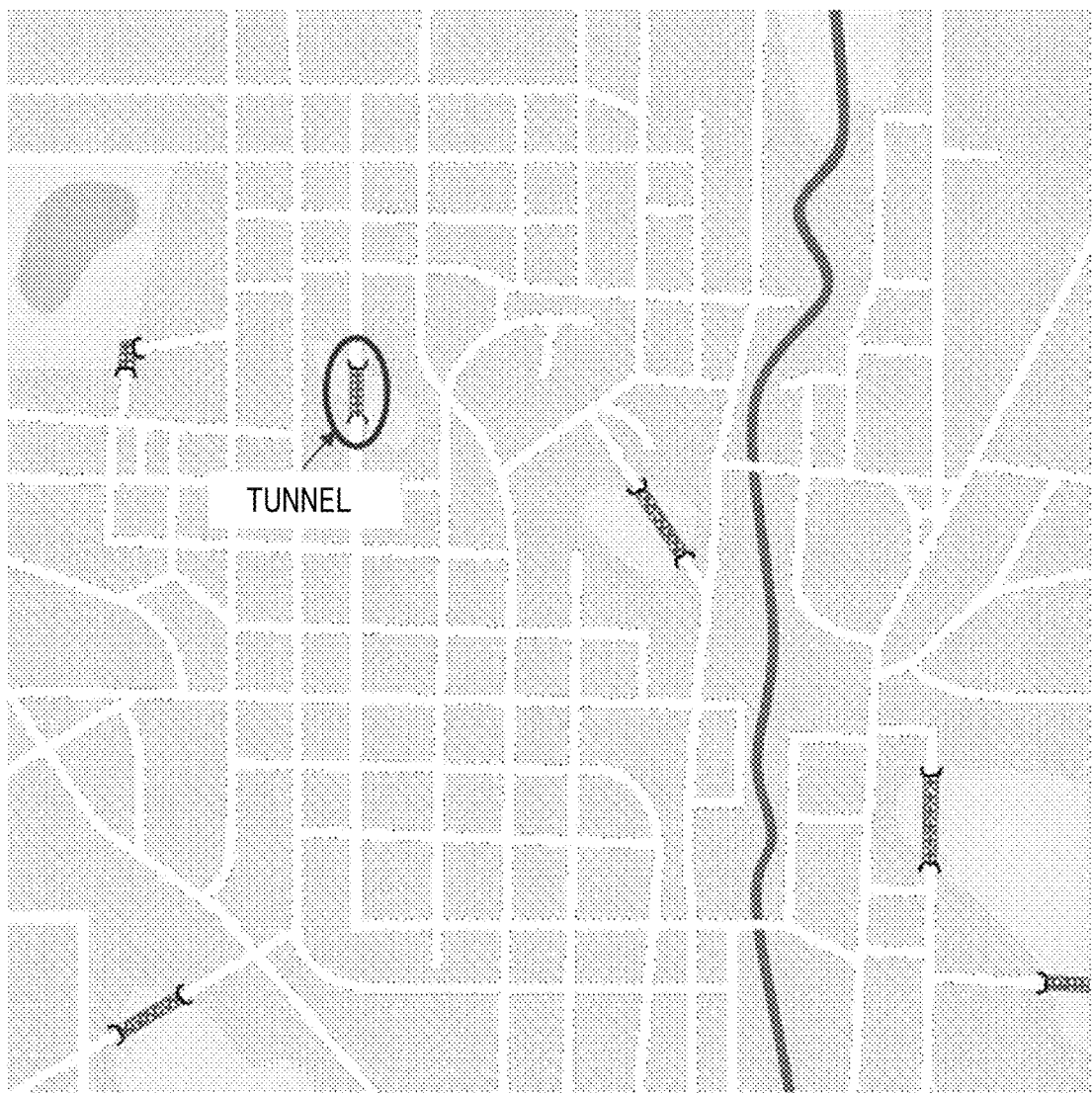
FIG. 5 is a plan view for describing unstable area information included in the communication situation information database according to the embodiments.

In the management system 90 according to the present embodiment, as illustrated in FIG. 5 as an example, information that indicates that communication is geographically unstable and is associated with the location information indicating locations at which the communication between the center side device 10 and the vehicle side device 20 is geographically unstable, such as a tunnel and a location under an elevating structure, is stored in the communication situation information database 13D as geographical communication information. In the management system 90 according to the present embodiment, information that indicates that communication is geographically stable and is associated with the location information indicating locations at which the communication between the center side device 10 and the vehicle side device 20 is not geographically unstable is stored in the communication situation information database 13D as geographical communication information. In the present embodiment, as illustrated in FIG. 3 as an example, information "unstable" is used as the information that indicates that the communication is geographically unstable, and information "normal" is used as the information that indicates that the communication is not geographically unstable. Needless to say, the information is not a limitation.

Hence, referring to the combination of the geographical communication information and the location information can grasp whether the communication between the center side device 10 and the vehicle side device 20 in a state in which an autonomous vehicle is traveling is geographically stable. The combination of the location information and the geographical communication information in the communication situation information database 13D corresponds to the unstable area information described above.

Hereinafter, the information registered in the communication situation information database 13D is collectively referred to as communication situation information.

Next, with reference to FIG. 6 to FIG. 14, operation of the management system 90 according to the present embodiment will be described. In order to avoid complication, a case will be described in which location information and geographical communication information are previously registered in the communication situation information database 13D.

First, with reference to FIG. 6, as operation of the vehicle side device 20 according to the present embodiment, operation of the vehicle side device 20 that performs a vehicle side communication process will be described. The CPU 21 of the vehicle side device 20 installed in any autonomous vehicle executes the vehicle side communication program 23A to perform the vehicle side communication process illustrated in FIG. 6. The vehicle side communication process illustrated in FIG. 6 is performed when, for example, the autonomous vehicle in which the vehicle side device 20 is installed starts autonomous traveling.

Figure 6:
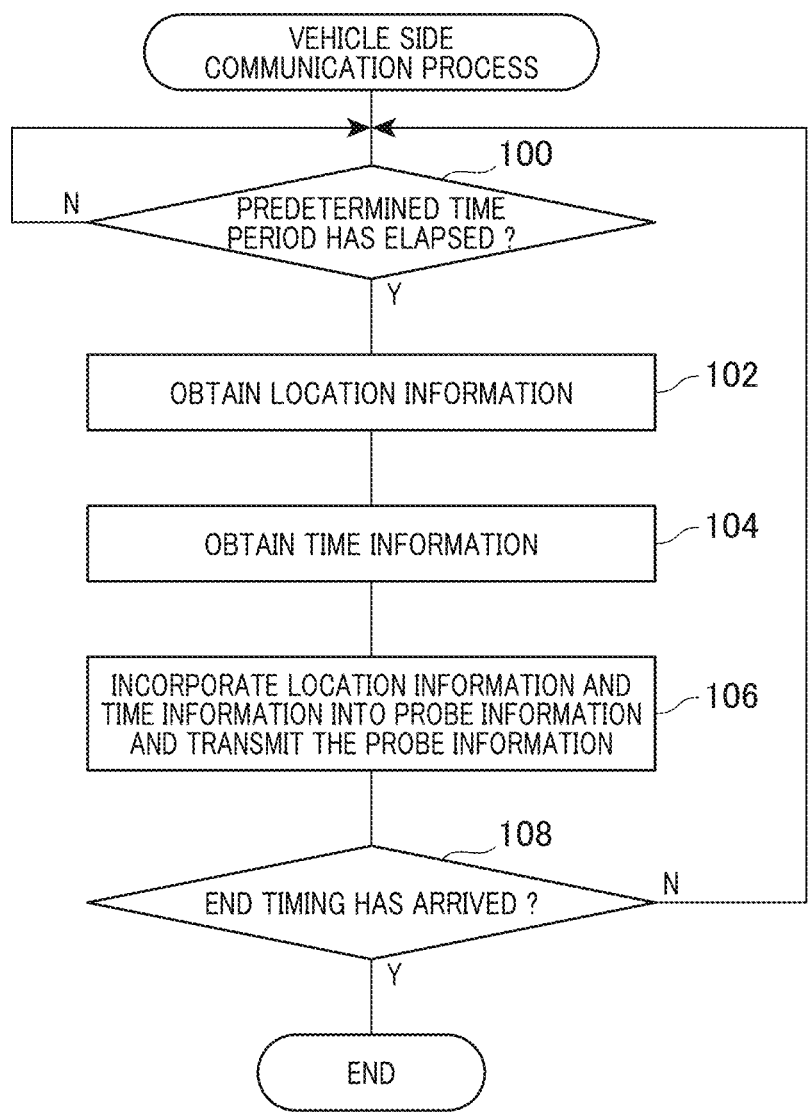
FIG. 6 is a flowchart of an example of a vehicle side communication process according to the embodiments.

In step 100 in FIG. 6, the vehicle side transmission unit 21A waits until a predetermined time period (in the present embodiment, 0.5 minutes) elapses. In step 102, the vehicle side transmission unit 21A obtains location information indicating a location of an own vehicle from the position detection section 29. In next step 104, the vehicle side transmission unit 21A obtains time information indicating current time. In step 106, the vehicle side transmission unit 21A incorporates the obtained location information and time information into probe information and transmits the probe information to the center side device 10 via the radio communication unit 28 and the network 80. In the present embodiment, as described above, the time information is obtained from the clock unit included in the CPU 21. Needless to say, this is not a limitation.

In step 108, the vehicle side transmission unit 21A determines whether predetermined end timing has arrived. If a negative determination is made, the process returns to step 100. In contrast, if a positive determination is made, the present vehicle side communication process ends. In the present embodiment, as the end timing, the timing at which ignition off of the autonomous vehicle is detected is used. However, this is not a limitation. For example, the timing at which instruction information for an instruction to end the vehicle side communication process is received from the center side device 10 via the radio communication unit 28 may be used as the end timing.

Next, with reference to FIG. 7, as operation of the center side device 10 according to the present embodiment, operation of the center side device 10 in a case in which a center side communication process is performed will be described. The CPU 11 of the center side device 10 performs the center side communication program 13A to perform the center side communication process illustrated in FIG. 7. The center side communication process illustrated in FIG. 7 is performed when a predetermined time (for example, four o'clock), which is the time at which services included in the autonomous driving assistance service start, has arrived.

Figure 7:
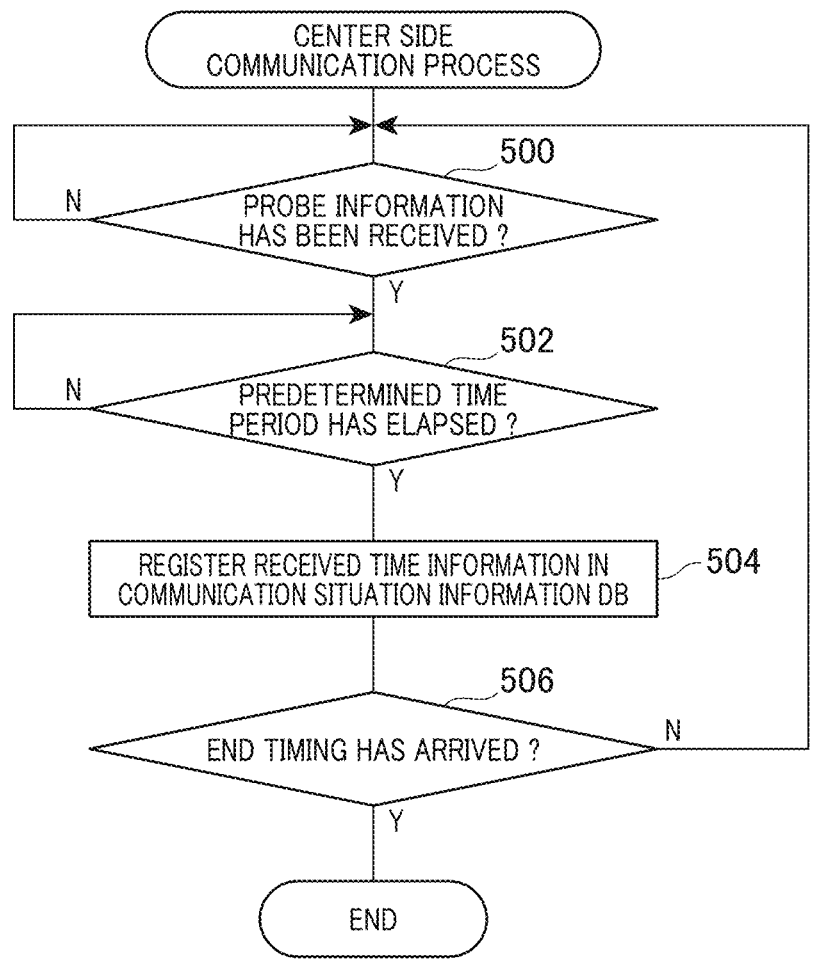
FIG. 7 is a flowchart of an example of a center side communication process according to the embodiments.

In step 500 in FIG. 7, the center side reception unit 11A waits until receiving probe information from any autonomous vehicle. In next step 502, the management unit 11B waits until a predetermined time period (in the present embodiment, 2 minutes) elapses. In next step 504, the management unit 11B stores (registers) time information included in the received probe information, as communication date/time information corresponding to location information included in the probe information, in a storage area corresponding to the communication situation information database 13D. Registering the probe information, for autonomous vehicles, as communication situation information at predetermined time intervals can reduce the capacity of the communication situation information database 13D.

In step 506, the management unit 11B determines whether predetermined end timing has arrived. If a negative determination is made, the process returns to step 500. In contrast, if a positive determination is made, the present center side communication process ends. In the present embodiment, as the end timing, the timing at which a predetermined time (for example, one o'clock), at which services included in the autonomous driving assistance service ends, has arrived is used. However, this is not a limitation. For example, the end timing may be the timing at which instruction information for an instruction to end the center side communication process is input by a manager of the center side device 10 via the communication I/F unit 18.

Next, with reference to FIG. 8, as operation of the center side device 10 according to the present embodiment, operation of the center side device 10 that performs a communication situation information transmission process will be described. The CPU 11 of the center side device 10 executes the communication situation information transmission program 13B to perform the communication situation information transmission process illustrated in FIG. 8. The communication situation information transmission process illustrated in FIG. 8 is performed when, for example, a predetermined time (for example, four o'clock), at which services included in the autonomous driving assistance service start, has arrived.

Figure 8:
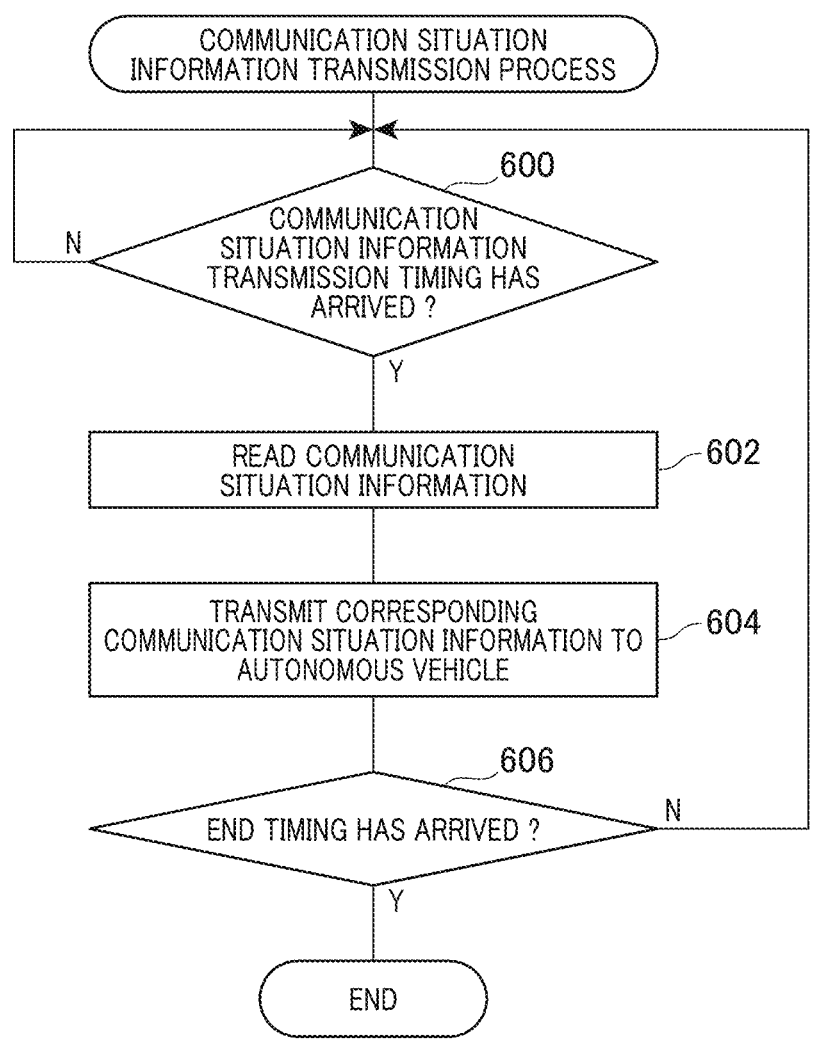
FIG. 8 is a flowchart of an example of a communication situation information transmission process according to the first to third embodiments.

In step 600 in FIG. 8, the center side transmission unit 11C waits until a predetermined timing, at which communication situation information is transmitted to the autonomous vehicle, arrives. In the present embodiment, as the above predetermined timing, the timing every after a predetermined time period (for example, one minute) is used. Needless to say, this is not a limitation.

In step 602, the center side transmission unit 11C reads all the communication situation information from the communication situation information database 13D. In next step 604, the center side transmission unit 11C extracts, from the read communication situation information, information (hereinafter, referred to as corresponding communication situation information) that corresponds to a location (traveling location), at which the destination autonomous vehicle is traveling, and is obtained during a predetermined time period (for example, ten minutes) before that time. Since geographical communication information in the communication situation information does not have a concept of time, all the information corresponding to the traveling location of the destination autonomous vehicle is extracted. The center side transmission unit 11C transmits the extracted corresponding communication situation information to the autonomous vehicle via the communication I/F unit 18 and the network 80. In the present embodiment, as the information corresponding to the traveling location of the destination autonomous vehicle, information within a predetermined area (for example, a radius of 1 km) around the traveling location of the corresponding autonomous vehicle is used. However, this is not a limitation. For example, as the corresponding communication situation information, all of the communication situation information registered in the communication situation information database 13D may be used, or communication situation information corresponding only to a traveling route of the destination autonomous vehicle may be used.

In next step 606, the center side transmission unit 11C determines whether predetermined end timing has arrived. If a negative determination is made, the process returns to step 600. In contrast, if a positive determination is made, the present communication situation information transmission process ends. In the present embodiment, as the end timing, the timing at which a predetermined time (for example, one o'clock), at which services included in the autonomous driving assistance service ends, has arrived is used. However, this is not a limitation. For example, the end timing may be the timing at which instruction information for an instruction to end the communication situation information transmission process is input by a manager of the center side device 10 via the communication I/F unit 18.

Figure 9:
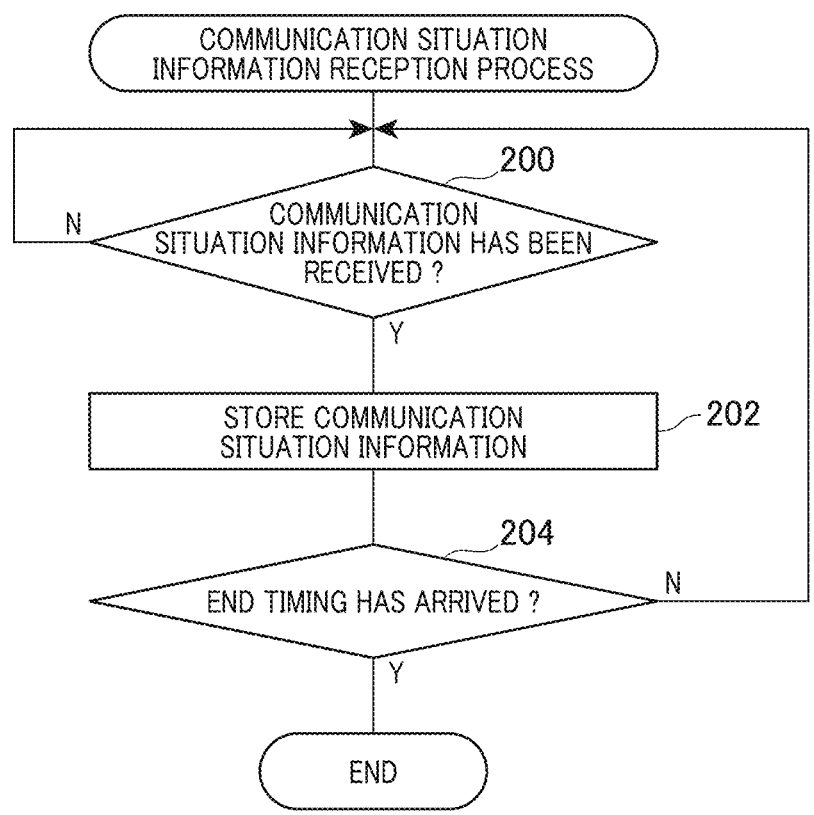
FIG. 9 is a flowchart of an example of a communication situation information reception process according to the first to third embodiments.

Next, with reference to FIG. 9, as operation of the vehicle side device 20 according to the present embodiment, operation of the vehicle side device 20 that performs a communication situation information reception process will be described. The CPU 21 of the vehicle side device 20 installed in any autonomous vehicle executes the communication situation information reception program 23B to perform the communication situation information reception process illustrated in FIG. 9. The communication situation information reception process illustrated in FIG. 9 is performed when, for example, the autonomous vehicle in which the vehicle side device 20 is installed starts autonomous traveling.

Next in step 200 in FIG. 9, the vehicle side reception unit 21B waits until receiving corresponding communication situation information (hereinafter, simply referred to as communication situation information) from the center side device 10. In next step 202, the vehicle side reception unit 21B stores the received communication situation information in a predetermined area of the storage unit 23.

In next step 204, the vehicle side reception unit 21B determines whether predetermined end timing has arrived. If a negative determination is made, the process returns to step 200. In contrast, if a positive determination is made, the present communication situation information reception process ends. In the present embodiment, as the end timing, the timing at which ignition off of the autonomous vehicle is detected is used. However, this is not a limitation. For example, the timing at which instruction information for an instruction to end the communication situation information reception process is received from the center side device 10 via the radio communication unit 28 may be used as the end timing.

Next, with reference to FIG. 10, as operation of the vehicle side device 20 according to the present embodiment, operation of the vehicle side device 20 that performs a vehicle side communication disconnection process will be described. The CPU 21 of the vehicle side device 20 installed in any autonomous vehicle executes the vehicle side communication disconnection program 23C to perform the vehicle side communication disconnection process illustrated in FIG. 10. The vehicle side communication disconnection process illustrated in FIG. 10 is performed when, for example, the autonomous vehicle in which the vehicle side device 20 is installed starts autonomous traveling.

Figure 10:
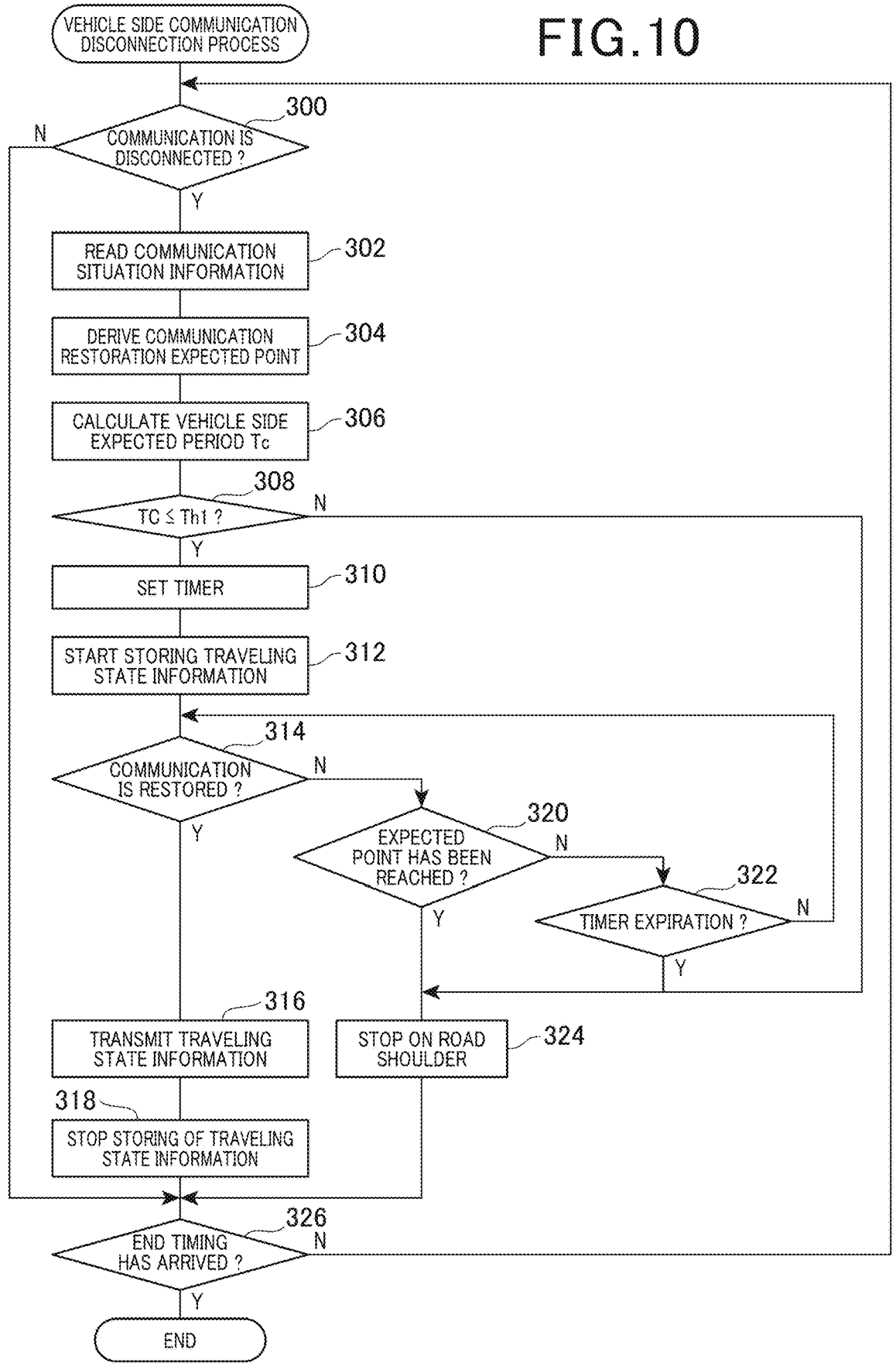
FIG. 10 is a flowchart of an example of a vehicle side communication disconnection process according to the first and third embodiments.

In step 300 in FIG. 10, the vehicle side determination unit 21C determines whether communication with the center side device 10 has been disconnected. If a negative determination is made, the process proceeds to step 326 described later. In contrast, if a positive determination is made, the process proceeds to step 302.

In step 302, the vehicle side determination unit 21C reads communication situation information stored by the communication situation information reception process described above from the storage unit 23. In next step 304, the vehicle side determination unit 21C uses the read communication situation information to derive a point (location) where restoration of the disconnected communication with the center side device 10 is expected (communication restoration expected point (location)) as below.

That is, the vehicle side determination unit 21C obtains location information indicating a location at the current time point from the position detection section 29, and assumes that the location indicated by the obtained location information is a location of the point at which communication with the center side device 10 is disconnected (hereinafter, referred to as a communication disconnection start location).

Next, the vehicle side determination unit 21C derives, as a communication restoration expected point, a location closer to the communication disconnection start location between locations meeting the following first and second conditions.

(First condition) The location is the nearest location, which is on the road, downstream from the communication disconnection start location in the traveling direction of the own vehicle, and communication date/time information of the location is stored in the communication record information of the communication situation information.

(Second condition) The location is the nearest location, which is on the road, downstream from the communication disconnection start location in the traveling direction of the own vehicle, and information "normal" is stored in the unstable area information of the communication situation information.

The method of deriving a communication restoration expected point is not limited to the above method. For example, a location meeting any one of the first and second conditions may be used as the communication restoration expected point.

In next step 306, the vehicle side determination unit 21C uses the derived communication restoration expected point to calculate a vehicle side expected period Tc, which is a period within which communication with the center side device 10 is expected to be restored, by using the following expression (1). Ds in the expression (1) indicates a travel distance of the own vehicle from the communication disconnection start location to the communication restoration expected point. Sp indicates a traveling speed of the own vehicle.

$$Tc=Ds/Sp \qquad (1)$$

Figure 11:
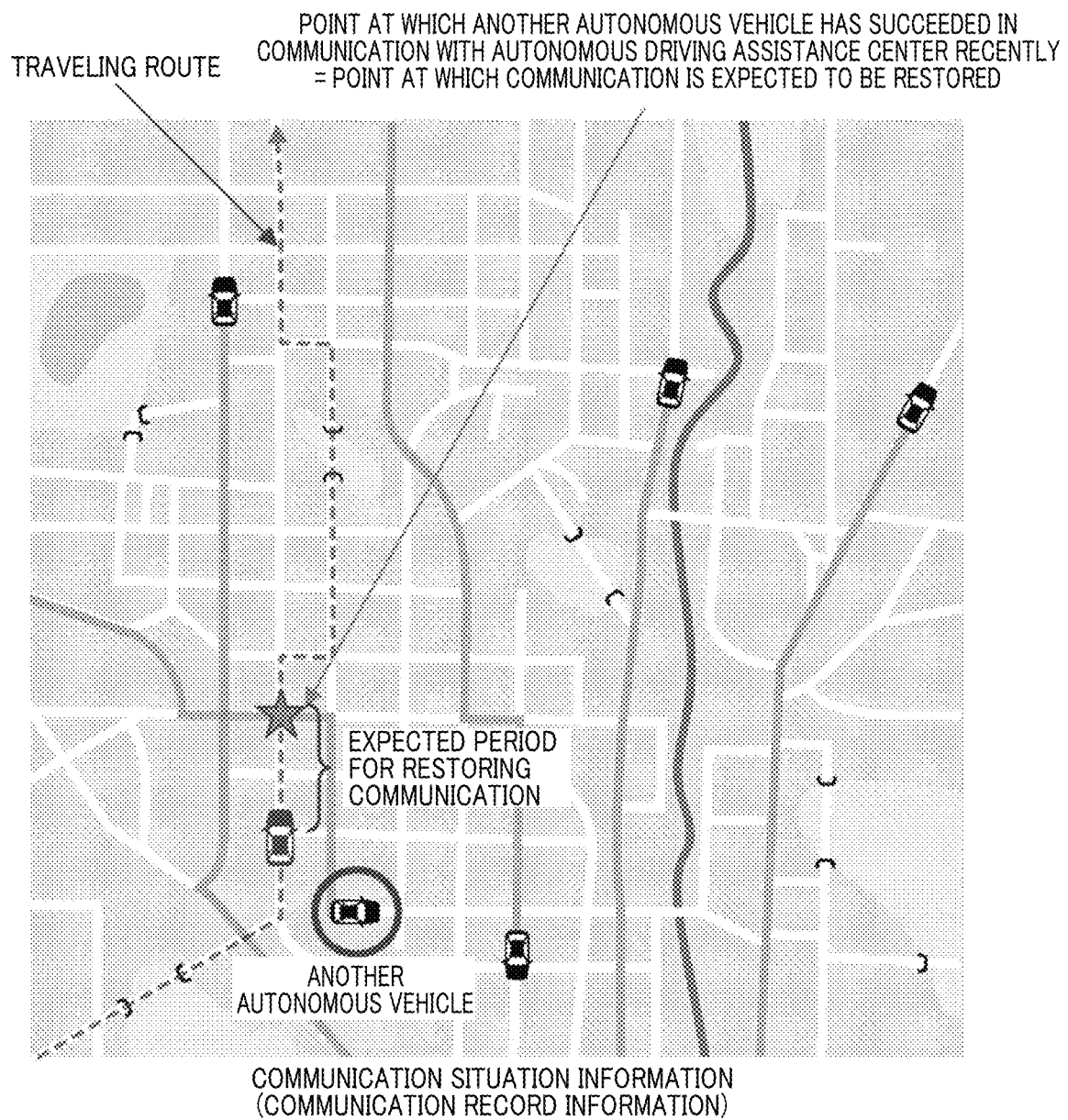
FIG. 11 is a plan view for describing vehicle side and center side communication disconnection processes according to the embodiments.

That is, if the used communication restoration expected point has obtained under the condition meeting the first condition, as illustrated in FIG. 11 as an example, a period within which the own vehicle is expected to reach the communication restoration expected point (as an example, a point marked with an asterisk in FIG. 11) obtained by using the communication record information obtained by another autonomous vehicle is calculated by the following expression (1).

Figure 12:
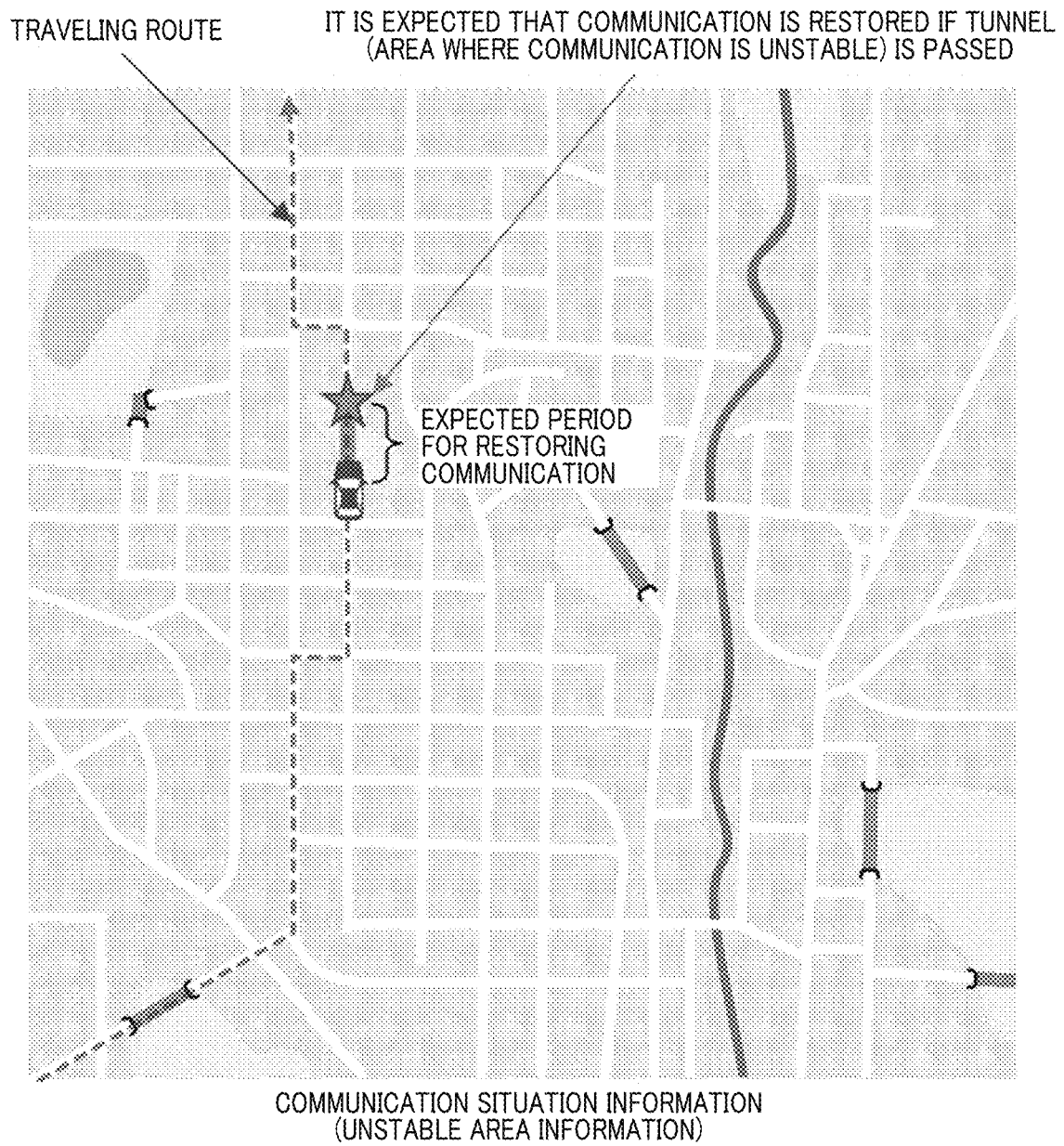
FIG. 12 is a plan view for describing the vehicle side and center side communication disconnection processes according to the embodiments.

If the used communication restoration expected point has obtained under the condition meeting the second condition, as illustrated in FIG. 12 as an example, a period within which the own vehicle is expected to reach the communication restoration expected point (as an example, a point marked with an asterisk in FIG. 12), which is obtained by using the unstable area information and is a location deviated from the area where communication becomes unstable, for example, a tunnel, is calculated by the following expression (1).

In next step 308, the vehicle side determination unit 21C determines whether the calculated vehicle side expected period Tc is a predetermined threshold value Th1 or less. If a negative determination is made, the process proceeds to step 324 describe later. In contrast, if a positive determination is made, the process proceeds to 310.

In step 310, the vehicle side determination unit 21C sets a timer (in the present embodiment, a timer included in the CPU 21), which is not shown, for the vehicle side expected period Tc. According to the setting of the timer for the vehicle side expected period Tc, the timer starts counting continued until the vehicle side expected period Tc elapses.

In step 312, the vehicle side determination unit 21C starts storing (registering) the traveling state information indicating a traveling state of the own vehicle in the storage unit 23. In the present embodiment, as the traveling state information, information indicating a traveling speed and a traveling location of the own vehicle is used. Instead of this, any information, such as images or sensing results obtained from an in-vehicle camera, may be used if the information can specify a traveling state of the own vehicle.

In next step 314, the vehicle side determination unit 21C determines whether communication with the center side device 10 has been restored. If a positive determination is made, the process proceeds to step 316. In step 316, if traveling state information is requested by the center side device 10, the vehicle side transmission unit 21A reads traveling state information stored in the storage unit 23 until the current time point to transmit the read traveling state information to the center side device 10 via the radio communication unit 28 and the network 80. In next step 318, the vehicle side determination unit 21C stops storing of traveling state information started in step 312 to delete the traveling state information from the storage unit 23. Thereafter, the process proceeds to step 326 described later. As described above, in the present embodiment, traveling state information is transmitted from an autonomous vehicle to the center side device 10 in response to a request by the center side device 10. However, this is not a limitation. For example, traveling state information may be automatically transmitted to the center side device 10 at the time point at which disconnection of communication with the center side device 10 is restored.

In contrast, if a negative determination is made in step 314, the process proceeds to step 320, in which the vehicle side determination unit 21C obtains location information indicating a location at that time point from the position detection section 29. Then, the vehicle side determination unit 21C determines whether the location indicated by the obtained location information has reached the communication restoration expected point. If a positive determination is made, the process proceeds to step 324 described later. In contrast, if a negative determination is made, the process proceeds to step 322.

In step S322, the vehicle side determination unit 21C determines whether counting by the timer has reached the set vehicle side expected period Tc. If a negative determination is made, the process returns to step 314. In contrast, if a positive determination is made, the process proceeds to step 324.

In step 324, the stop unit 21D performs control for stopping the own vehicle, which is automatically driven, on the closest road shoulder. Thereafter, the process proceeds to step 326.

In step 326, the vehicle side determination unit 21C determines whether predetermined end timing has arrived. If a negative determination is made, the process returns to step 300. In contrast, if a positive determination is made, the present vehicle side communication disconnection process ends. In the present embodiment, as the end timing, the timing at which ignition off of the autonomous vehicle is detected is used. However, this is not a limitation. For example, the timing at which instruction information for an instruction to end the vehicle side communication disconnection process is received from the center side device 10 via the radio communication unit 28 may be used as the end timing.

Next, with reference to FIG. 13, as operation of the center side device 10 according to the present embodiment, operation of the center side device 10 in a case in which a center side communication disconnection process is performed will be described. The CPU 11 of the center side device 10 performs the center side communication disconnection program 13C to perform the center side communication disconnection process illustrated in FIG. 13. The center side communication disconnection process illustrated in FIG. 13 is performed when a predetermined time (for example, four o'clock), which is the time at which services included in the autonomous driving assistance service starts, has arrived.

Figure 13:
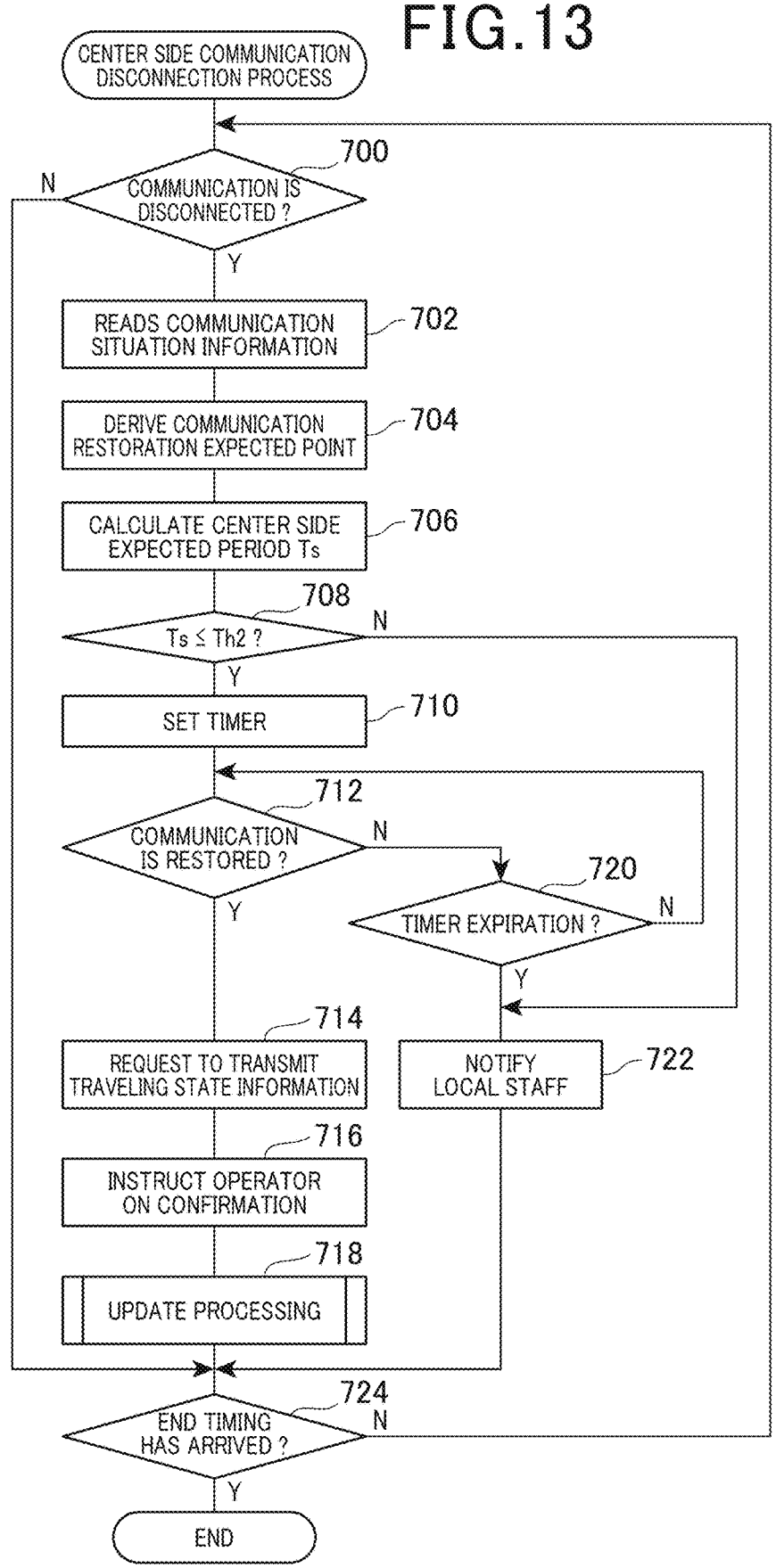
FIG. 13 is a flowchart of an example of a center side communication disconnection process according to the first and second embodiments and a fourth embodiment.

In step 700 in FIG. 13, the center side determination unit 11D determines whether communication with any vehicle side device 20 is disconnected. If a negative determination is made, the process proceeds to step 724. In contrast, if a positive determination is made, the process proceeds to step 702. Hereinafter, an autonomous vehicle with which communication is disconnected is referred to as a processing target vehicle.

In step 702, the center side determination unit 11D reads communication situation information from the communication situation information database 13D. In step 704, the center side determination unit 11D uses the read communication situation information to derive a location where restoration of the communication with the vehicle side device 20, which is a processing target vehicle, is expected (communication restoration expected point (location)) as below.

That is, the center side determination unit 11D first assumes that the location indicated by the location information included in the probe information received from the processing target vehicle most recently by the center side communication process described above is the communication disconnection start location, which is the location of a point at which communication with the processing target vehicle is disconnected.

Next, the center side determination unit 11D derives, as a communication restoration expected point, a location closer to the communication disconnection start location between locations meeting the following third and fourth conditions.

(Third condition) The location is the nearest location, which is on the road, downstream from the communication disconnection start location in the traveling direction of the processing target vehicle, and communication date/time information of the location is stored in the communication record information of the communication situation information.

(Fourth condition) The location is the nearest location, which is on the road, downstream from the communication disconnection start location in the traveling direction of the processing target vehicle, and information "normal" is stored in the unstable area information of the communication situation information.

The method of deriving a communication restoration expected point is not limited to the above method. For example, a location meeting any one of the third and fourth conditions may be used as the communication restoration expected point.

In next step 706, the center side determination unit 11D uses the derived communication restoration expected point to calculate a center side expected period Ts, which is a period within which communication with the processing target vehicle is expected to be restored, by using the following expression (2). Ds in the expression (2) indicates a travel distance of the processing target vehicle from the communication disconnection start location to the communication restoration expected point. Sp indicates a traveling speed of the own vehicle. The traveling speed Sp can be obtained from an amount of change per unit time of a traveling location indicated by the location information included in the probe information received by the center side communication process.

$$Ts = Ds/Sp \qquad (2)$$

That is, if the used communication restoration expected point has obtained under the condition meeting the third condition, as illustrated in FIG. 11 as an example, a period within which the processing target vehicle is expected to reach the communication restoration expected point (as an example, a point marked with an asterisk in FIG. 11) obtained by using the communication record information obtained by another autonomous vehicle is calculated by the following expression (2).

If the used communication restoration expected point has obtained under the condition meeting the fourth condition, as illustrated in FIG. 12 as an example, a period within which the processing target vehicle is expected to reach the communication restoration expected point (as an example, a point marked with an asterisk in FIG. 12), which is obtained by using the unstable area information and is a location deviated from the area where communication is unstable, for example, a tunnel, is calculated by the following expression (2).

In next step 708, the center side determination unit 11D determines whether the calculated center side expected period Ts is a predetermined threshold value Th2 or less. If a negative determination is made, the process proceeds to step 722 describe later. In contrast, if a positive determination is made, the process proceeds to 710.

In step 710, the center side determination unit 11D sets a timer (in the present embodiment, a timer included in the CPU 11), which is not shown, for the center side expected period Ts. According to the setting of the timer for the center side expected period Ts, the timer starts counting continued until the center side expected period Ts elapses.

In next step 712, the center side determination unit 11D determines whether communication with the processing target vehicle has been restored. If a positive determination is made, the process proceeds to step 714. In step 714, the requirement unit 11E requests traveling state information, which indicates a traveling state of the processing target vehicle during the period during which the communication is disconnected, from the processing target vehicle. In response to the request by the requirement unit 11E, the processing target vehicle transmits the traveling state information to the center side device 10 as described above.

In next step 716, in order to cause an operator to confirm whether the traveling state indicate by the traveling state information received from the processing target vehicle is abnormal, the setting unit 11G transmits the traveling state information and confirmation instruction information for instructing confirmation of the traveling state information to the operator device 50 vis the communication I/F unit 18 and the network 80. On receiving the traveling state information and the confirmation instruction information, the processing unit 51A of the operator device 50 controls the display unit 55 so as to display the received traveling state information.

The operator of the operator device 50 confirms whether contents of the traveling state information displayed on the display unit 55 have a problem and inputs the confirmation result information indicating a result of the confirmation via the input unit 54. The processing unit 51A transmits the input confirmation result information to the center side device 10 via the communication I/F unit 18 and the network 80.

In next step 718, the setting unit 11G receives the confirmation result information from the operator device 50. If the received confirmation result information indicates that there is no abnormality, the setting unit 11G performs an update process that updates the communication situation information database 13D so as to incorporate sections, in which the processing target vehicle has traveled during the period during which the communication was disconnected, into the unstable area information as an area where communication is likely to be unstable. Thereafter, the process proceeds to step 724 described later.

In contrast, if a negative determination is made in step 712, the process proceeds to step 720. The center side determination unit 11D determines whether counting by the timer has reached the set center side expected period Ts. If a negative determination is made, the process returns to step 712. In contrast, if a positive determination is made, the process proceeds to step 722.

In step 722, the notification unit 11F derives, as the disconnection related information described above, information including information on a point where communication is disconnected, time at which the communication is disconnected, a path, which is considered that the processing target vehicle has traveled thereon during the period during which the communication is disconnected, and a communication restoration expected point. The notification unit 11F transmits the derived disconnection related information and assistance instruction information, which instructs assistance for the processing target vehicle with which the communication is disconnected, to the mobile terminal 40 carried by a local staff nearest to the processing target vehicle via the communication I/F unit 18 and the network 80. Thereafter, the process proceeds to step 724.

Figure 14:
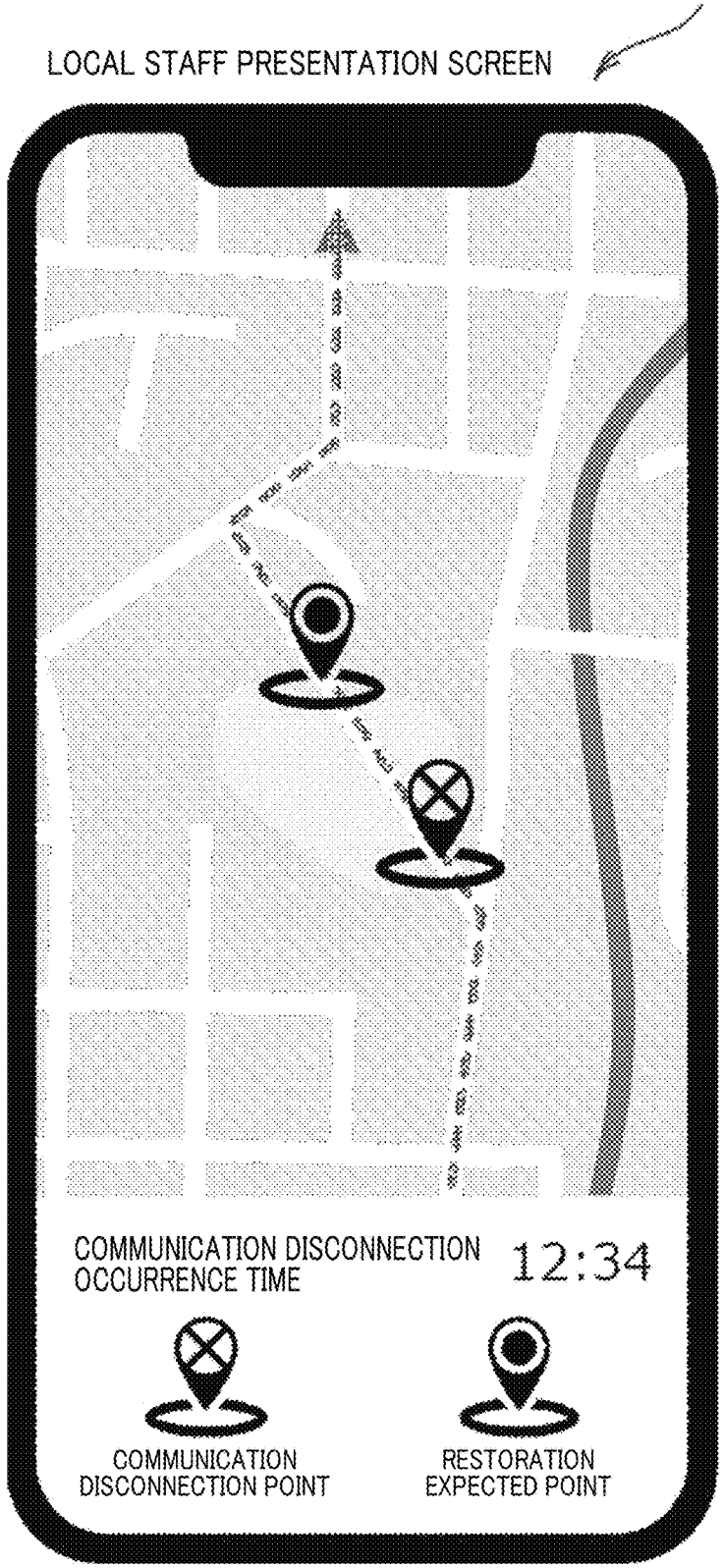
FIG. 14 is a front view of an example of a local staff presentation screen according to the embodiments.

On receiving the disconnection related information and the assistance instruction information, the processing unit 41A of the mobile terminal 40 displays, as an example, a local staff presentation screen illustrated in FIG. 14 on the display unit 45. On the local staff presentation screen illustrated in FIG. 14, a point where communication is disconnected (indicated as "communication disconnection point" in FIG. 14 and, hereinafter, referred to as a communication disconnection point) and a communication restoration expected point (indicated as "restoration expected point" in FIG. 14 and, hereinafter, referred to as a restoration expected point) are displayed. In addition, on the local staff presentation screen illustrated in FIG. 14, time at which the communication is disconnected (indicated as "communication disconnection occurrence time" in FIG. 14) and a path that is considered that the processing target vehicle has traveled thereon during the period during which the communication is disconnected are displayed.

The local staff who has referred to the local staff presentation screen illustrated in FIG. 14 searches a range from the communication disconnection point to the restoration expected point. Hence, a processing target vehicle, communication with which is not restored even if the center side expected period Ts has elapsed, that is, a processing target vehicle to be assisted can be easily found.

In step 724, the center side determination unit 11D determines whether predetermined end timing has arrived. If a negative determination is made, the process returns to step 700. In contrast, if a positive determination is made, the present center side communication disconnection process ends. In the present embodiment, as the end timing, the timing at which a predetermined time (for example, one o'clock), at which services included in the autonomous driving assistance service ends, has arrived is used. However, this is not a limitation. For example, the end timing may be the timing at which instruction information for an instruction to end the center side communication process is input by a manager of the center side device 10 via the communication I/F unit 18.

As described above, according to the present embodiment, when communication between the autonomous driving assistance center and an autonomous vehicle is disconnected, it is determined whether to continue autonomous traveling and whether to notify an assistant assisting the autonomous vehicle, based on communication situation information that indicates situations of communication between the autonomous driving assistance center and the autonomous vehicle at each place, where the autonomous vehicle can travel, in the management target area of the management system 90. Hence, continuity of the autonomous driving assistance service can be prevented from being reduced, and the cost of the autonomous driving assistance service can be prevented from increasing.

According to the present embodiment, the vehicle side determination unit 21C derives a vehicle side expected period Tc, which is a period within which disconnected communication is expected to be restored, based on a traveling route of the autonomous vehicle to which the vehicle side determination unit 21C is provided and the communication situation information. If the derived vehicle side expected period Tc is a predetermined period or less, the vehicle side determination unit 21C determines to continue the autonomous traveling. Hence, appropriately setting the predetermined period can prevent continuity of the autonomous driving assistance service from being reduced more appropriately.

According to the present embodiment, the center side determination unit 11D derives a center side expected period Ts, which is a period within which disconnected communication is expected to be restored, based on a traveling route of the autonomous vehicle on which the communication is disconnected and the communication situation information. If the derived center side expected period Ts is a predetermined period or less, the center side determination unit 11D determines not to notify an assistant. Hence, appropriately setting the predetermined period can prevent the cost of the autonomous driving assistance service from increasing more appropriately.

According to the present embodiment, when the communication with the autonomous vehicle is not restored even if the center side expected period Ts has elapsed, the center side determination unit 11D determines to notify an assistant. Hence, the cost of the autonomous driving assistance service can be prevented from increasing while safety and a sense of safety of the autonomous driving assistance service are maintained.

Second Embodiment

In the present second embodiment, a case will be described in which autonomous traveling is continued when a degree of the necessity of assistance by an assistant on a path to a point (location) where restoration of the communication is expected (communication restoration expected point (location)) is a predetermined level or less. Since the configuration of the management system 90 according to the present embodiment is the same as the configuration according to the first embodiment (refer to FIG. 1 and FIG. 2), the description of the configuration of the management system 90 will be omitted.

The vehicle side determination unit 21C according to the second embodiment is different from that of the first embodiment in that the vehicle side determination unit 21C according to the second embodiment determines to continue autonomous traveling if a degree of the necessity of assistance on a path to a point where restoration of the communication is expected is a predetermined level or less.

More specifically, if the path satisfies all the conditions that the path has no crosswalk, the path is a road on which pedestrians and vehicles are separated, and the path has no passenger platform when autonomous vehicles are vehicles accompanying boarding and alighting such as a bus and a taxi, the vehicle side determination unit 21C according to the second embodiment determines that the degree of the necessity of the assistance is the above level or less. Hence, in the storage unit 23 of the vehicle side device 20 according to the second embodiment, information (hereinafter, referred to as path related information) including information indicating a path having no crosswalk, information indicating a path that is a road on which pedestrians and vehicles are separated, and information indicating a path having no passenger platform in the management target area of the management system 90 are previously registered.

Next, with reference to FIG. 15, as operation of the vehicle side device 20 according to the second embodiment, operation of the vehicle side device 20 that performs the vehicle side communication disconnection process will be described. In the vehicle side communication disconnection process illustrated in FIG. 15, steps performing the same processing as that of the vehicle side communication disconnection process illustrated in FIG. 10 are denoted by the same step numbers as those in FIG. 10 to omit redundant descriptions.

Figure 15:
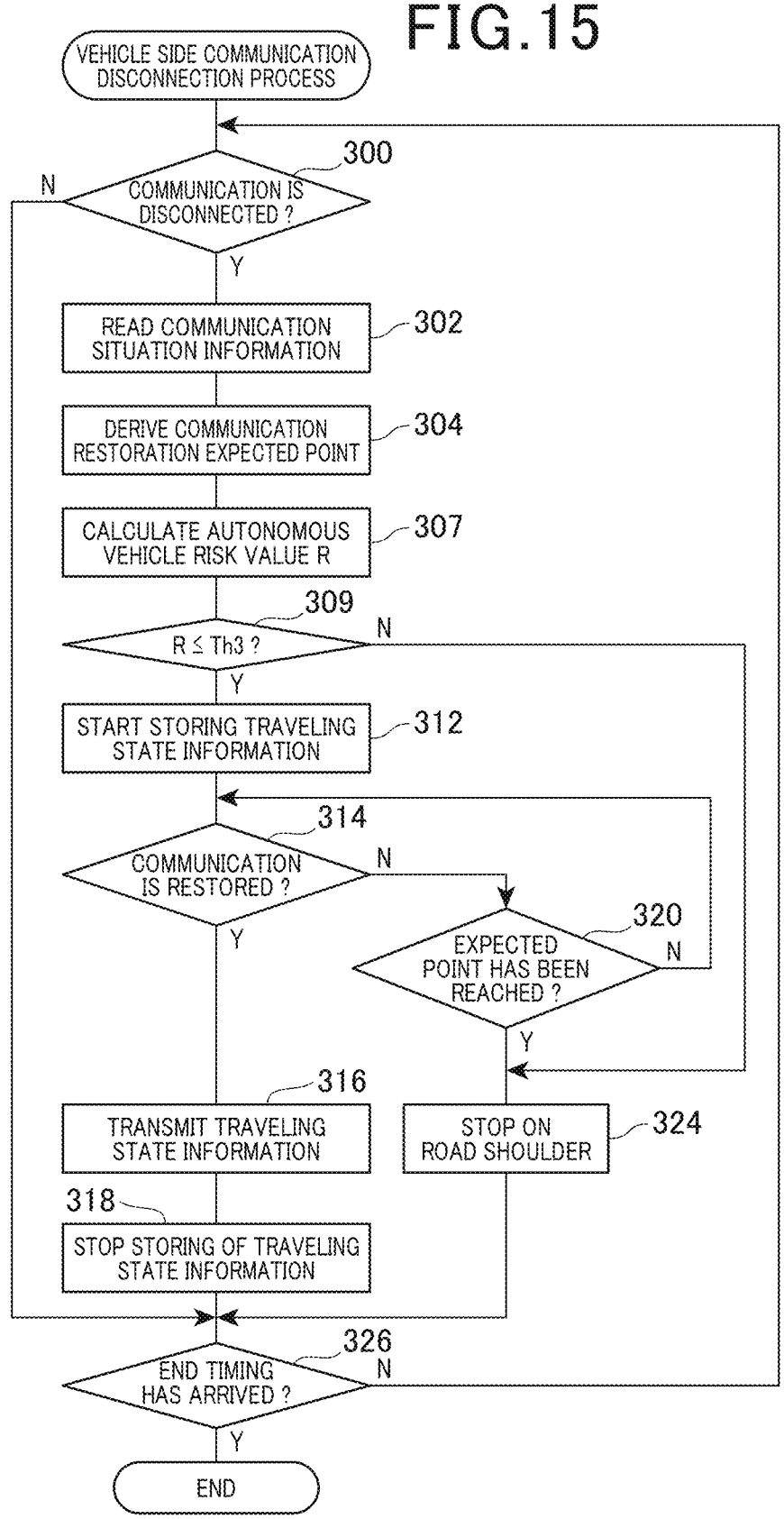
FIG. 15 is a flowchart of an example of a vehicle side communication disconnection process according to the second embodiment.

The vehicle side communication disconnection process illustrated in FIG. 15 differs from the vehicle side communication disconnection process illustrated in FIG. 10 in that the processing of step 306 and step 308 is replaced with processing of step 307 and step 309, and the processing of step 310 and step 322 is deleted.

That is, in step 307 in FIG. 15, the vehicle side determination unit 21C reads path related information from the storage unit 23, and uses the path related information and the communication restoration expected point derived by step 304 to calculate, by using the following expression (3), an autonomous driving risk value R indicating a degree of the necessity of assistance by an assistant on a path to the communication restoration expected point. Cp in the expression (3) is a variable for which 1 is substituted when a crosswalk is present in a section between the communication disconnection start location and the communication restoration expected point (hereinafter, referred to as a risk target section) and 0 is substituted when no crosswalk is present in the section. Dp in the expression (3) is a variable for which 1 is substituted when the risk target section is not a road on which pedestrians and vehicles are separated and 0 is substituted when the risk target section is a road on which pedestrians and vehicles are separated. Ep in the expression (3) is a variable for which 1 is substituted if there is a passenger platform in the risk target section when autonomous vehicles are vehicles accompanying boarding and alighting such as a bus and a taxi, and 0 is substituted if there is no passenger platform. When the autonomous vehicles are not vehicles accompanying boarding and alighting such as a bus and a taxi, 0 is substituted for the variable Ep.

$$R = Cp + Dp + Ep \quad (3)$$

Figure 16:
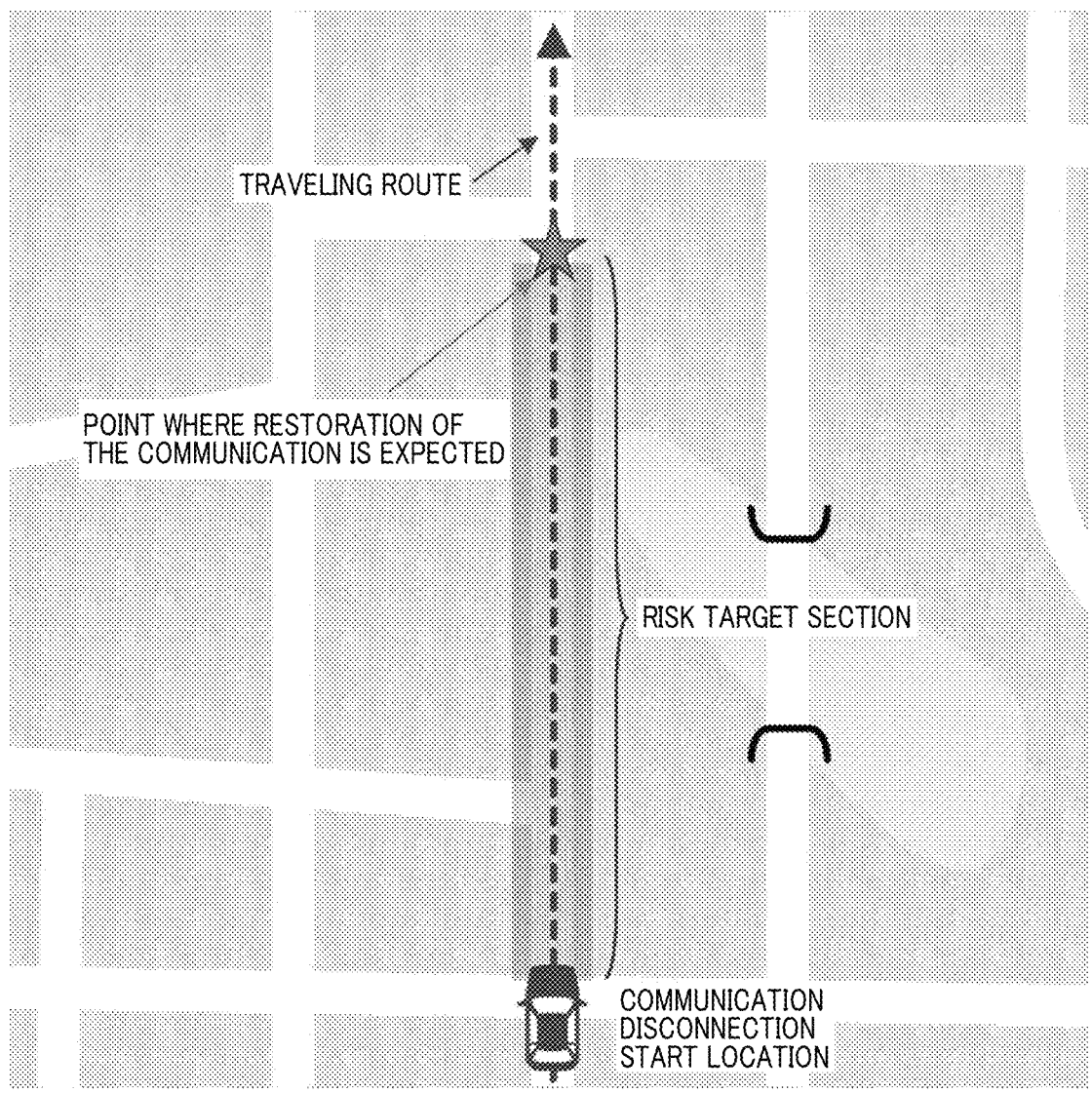
FIG. 16 is a plan view for describing the vehicle side communication disconnection process according to the second embodiment.

That is, as illustrated in FIG. 16 as an example, only when the risk target section has no crosswalk, the risk target section is a road on which pedestrians and vehicles are separated, and the risk target section has no passenger platform when autonomous vehicles are vehicles accompanying boarding and alighting such as a bus and a taxi, 0 is calculated as the autonomous driving risk value R by the expression (3).

Hence, in step 309, the vehicle side determination unit 21C determines whether the calculated autonomous driving risk value R is a predetermined threshold value Th3 (in the present embodiment, 0) or less. If a negative determination is made, the process proceeds to step 324. In contrast, if a positive determination is made, the process proceeds to step 312.

As described above, according to the present embodiment, based on a traveling route of the autonomous vehicle to which the vehicle side determination unit 21C is provided and the communication situation information, if a degree (autonomous driving risk value R) of the necessity of assistance by an assistant on a path to a point where restoration of the disconnected communication is expected is a predetermined level (threshold value Th3) or less, the vehicle side determination unit 21C determines to continue the autonomous traveling. Hence, compared with a case in which the autonomous driving risk value R is not used, continuity of the autonomous driving assistance service can be prevented from being reduced more appropriately.

In the first embodiment, if the vehicle side expected period Tc is a predetermined period or less (hereinafter, first condition), autonomous traveling is continued. In the second embodiment, if a degree of the necessity of assistance by an assistant on a path to a point where restoration of the disconnected communication is expected is a predetermined level or less (hereinafter, second condition), autonomous traveling is continued. However, these are not limitations. For example, if both of the first and second conditions are satisfied, autonomous traveling may be continued. Thus, compared with the first and second embodiments, safety of the autonomous traveling can be improved.

Third Embodiment

In the present third embodiment, a case will be mainly described in which communication situation information is effectively used to enable quick notification to a local staff. Since the configuration of the management system 90 according to the present embodiment is the same as the configuration according to the first embodiment (refer to FIG. 1 and FIG. 2), the description of the configuration of the management system 90 will be omitted.

The center side determination unit 11D according to the present third embodiment mainly differs from that of the first embodiment in that the latest communication situation information is used to determine whether to notify an assistant.

Next, with reference to FIG. 17, as operation of the center side device 10 according to the present third embodiment, operation of the center side device 10 that performs a center side communication disconnection process will be described. In the center side communication disconnection process illustrated in FIG. 17, steps performing the same processing as that of the center side communication disconnection process illustrated in FIG. 13 are denoted by the same step numbers as those in FIG. 13 to omit redundant descriptions.

Figure 17:
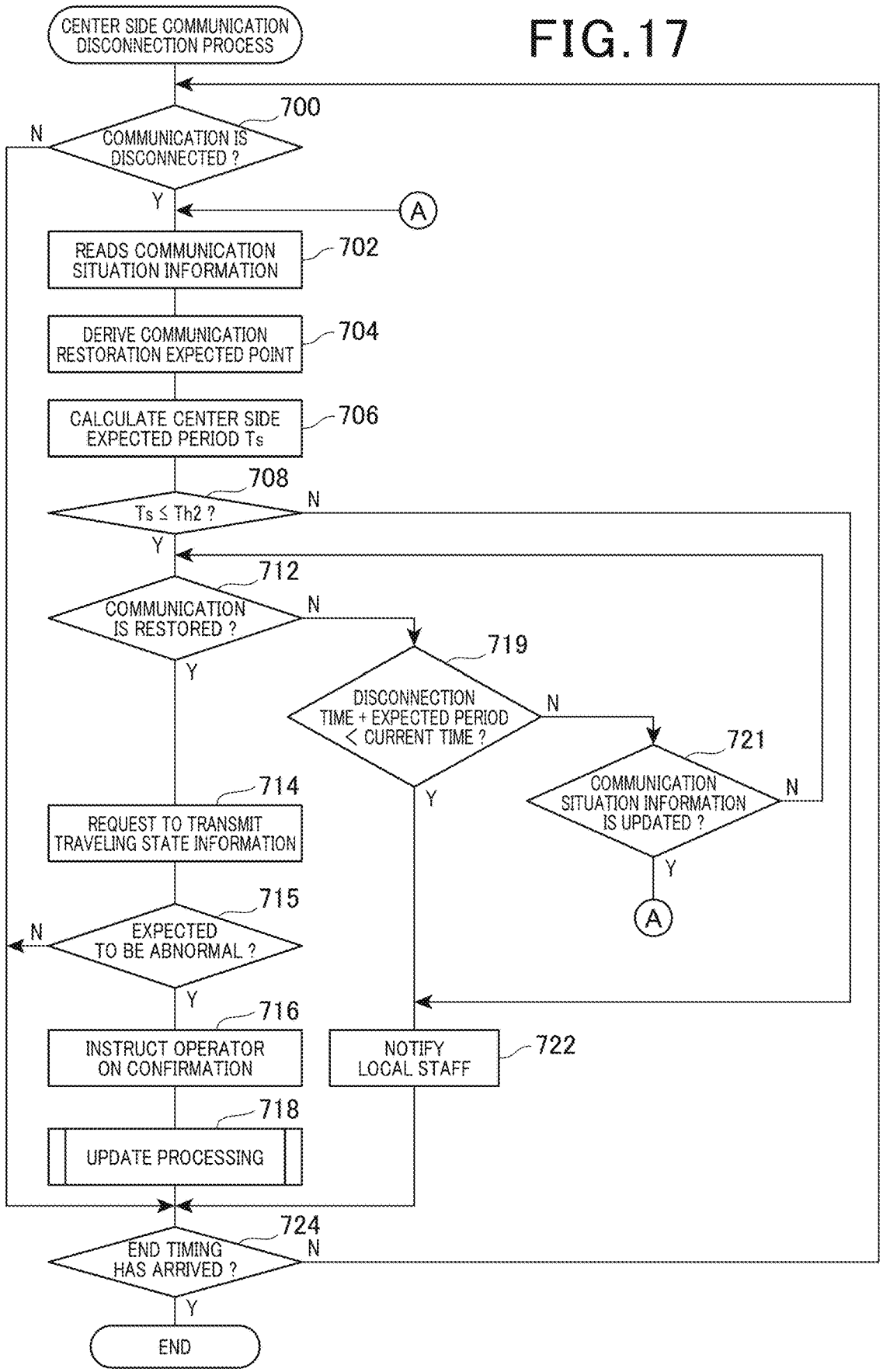
FIG. 17 is a flowchart of an example of a center side communication disconnection process according to the third embodiment.

The center side communication disconnection process illustrated in FIG. 17 differs from the center side communication disconnection process illustrated in FIG. 13 in that the processing of step 710 is deleted, processing of step 715 is added, and the processing of step 720 is replaced with processing of step 719 and step 721.

That is, in step 715 in FIG. 17, the setting unit 11G determines whether a traveling state indicated by traveling state information received from an autonomous vehicle is expected to be abnormal. If a positive determination is made, the process proceeds to step 716. In contrast, if a negative determination is made, the process proceeds to 724 without performing processing in step 716 and step 718. In the present embodiment, whether the traveling state is expected to be abnormal is determined based on whether the absolute value of an acceleration calculated from the received traveling state information is a predetermined threshold value or more or based on whether the traveling location indicated by the traveling state information is unstable. Needless to say, these are not limitations.

In step 719, the center side determination unit 11D determines whether the time (hereinafter, referred to as communication restoration expected time) obtained by adding the center side expected period Ts calculated by the processing in step 706 to the time at which communication with the autonomous vehicle is disconnected is before the current time. If a positive determination is made, the process proceeds to step 722. In contrast, if a negative determination is made, the process proceeds to step 721.

In step 721, the center side determination unit 11D determines whether the communication situation information read in step 702 is updated. If a positive determination is made, the process returns to step 702. In contrast, if a negative determination is made, the process returns to step 712.

As illustrated at the left in FIG. 18 as an example, a case will be described in which the time at which communication is disconnected is just 12:34, and an initial center side expected period Ts is two minutes. In this case, since a negative determination is made in step 719 until the current time arrives at the communication restoration expected time, the process proceeds to step 721 without performing processing for notifying a local staff (processing in step 722) and repeats processing in steps 712, 719, and 721 until the communication situation information is updated. If the communication situation information is updated while the processing is repeated, the process returns from step 721 to step 702, whereby the center side expected period Ts is recalculated by using the updated communication situation information.

Figure 18:
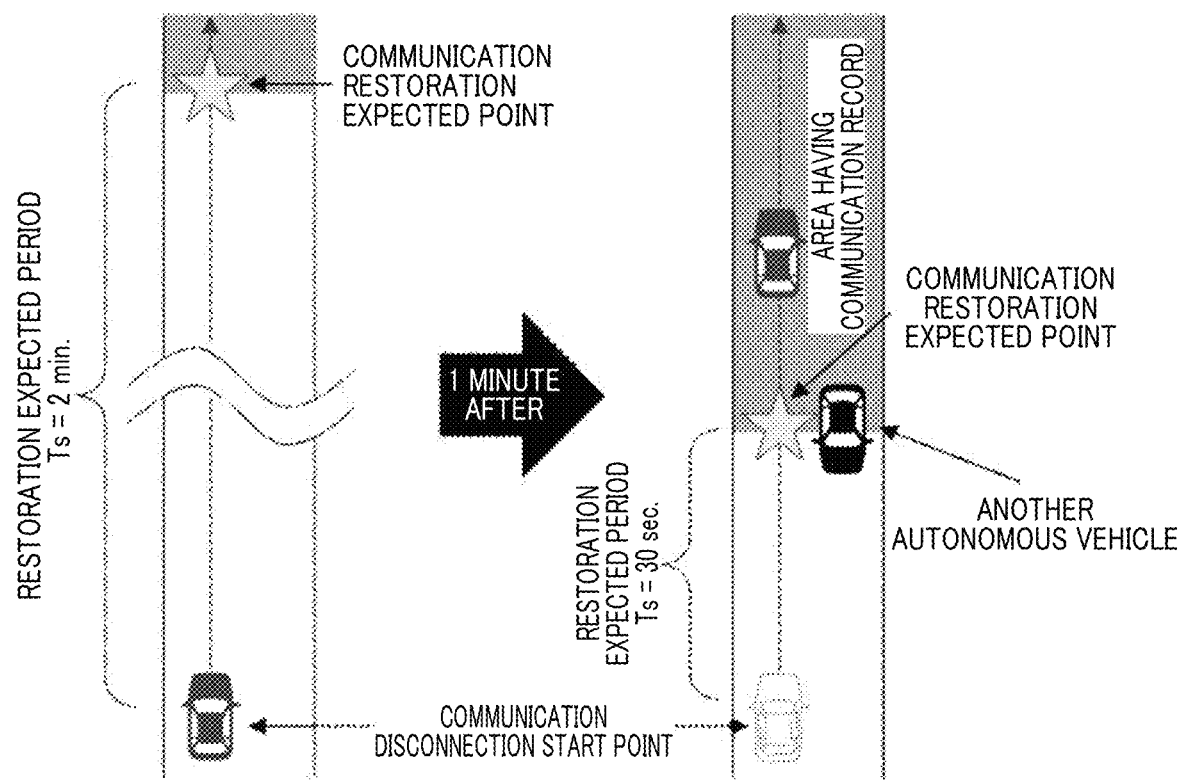
FIG. 18 is a plan view for describing the center side communication disconnection process according to the third embodiment.

Hence, as illustrated at the right in FIG. 18 as an example, when the recalculated center side expected period Ts is 30 seconds, and the current time is one minute after the communication is disconnected, a positive determination is made in step 719, whereby notification to a local staff is immediately performed. As illustrated in FIG. 18, when communication is not restored even though the vehicle is traveling in an area having a communication record, it may be expected that a communicator device has failed.

As described above, according to the present embodiment, the center side determination unit 11D recalculates the center side expected period Ts every time the communication situation information is updated. Hence, notification to a local staff can be performed more quickly.

According to the present embodiment, only when expecting that the traveling state of the processing target vehicle is abnormal, the setting unit 11G causes an assistant to confirm whether the traveling state indicated by the traveling state information is abnormal. Hence, the cost of the assistant can be further prevented from increasing.

Fourth Embodiment

Figure 19:
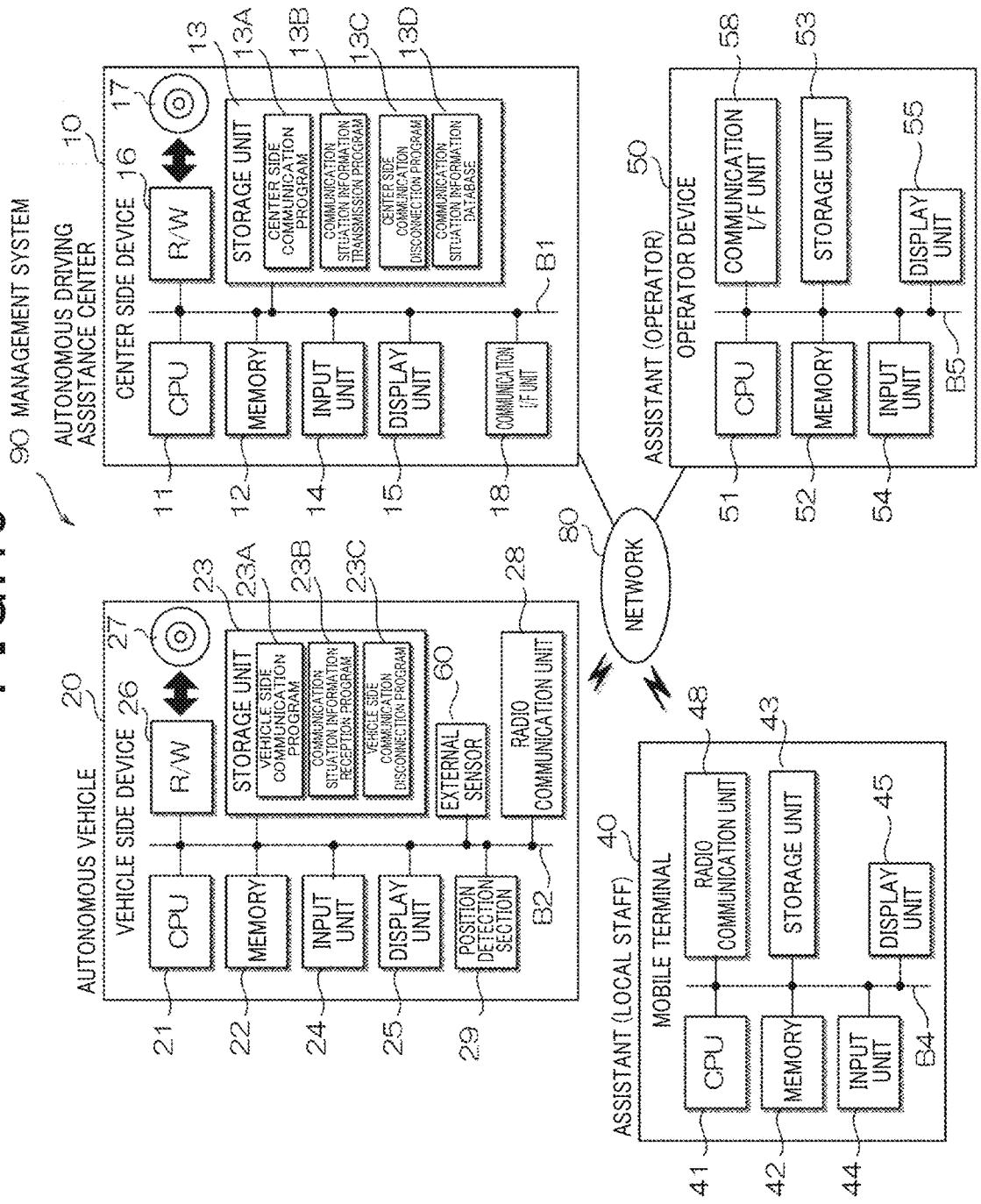
FIG. 19 is a block diagram illustrating an example of a hardware configuration of a management system according to the fourth embodiment.

In the present fourth embodiment, a case will be mainly described in which when autonomous traveling is continued in a state in which communication is disconnected, traveling speed of the autonomous vehicle is decreased more than usual. Referring to FIG. 19, a hardware configuration of the management system 90 according to the fourth embodiment will be described. In FIG. 19, the same components as those in FIG. 1 are denoted by the same reference signs as those in FIG. 1 to omit redundant descriptions.

As illustrated in FIG. 19, the management system 90 according to the fourth embodiment differs from the management system 90 according to the first embodiment only in that the vehicle side device 20 includes an external sensor 60. The external sensor 60 includes a camera capturing images of an area in front of the autonomous vehicle and a lidar measuring a distance to an obstacle. The CPU 21 can obtain image information acquired from the captured image, and ranging data.

Figure 20:
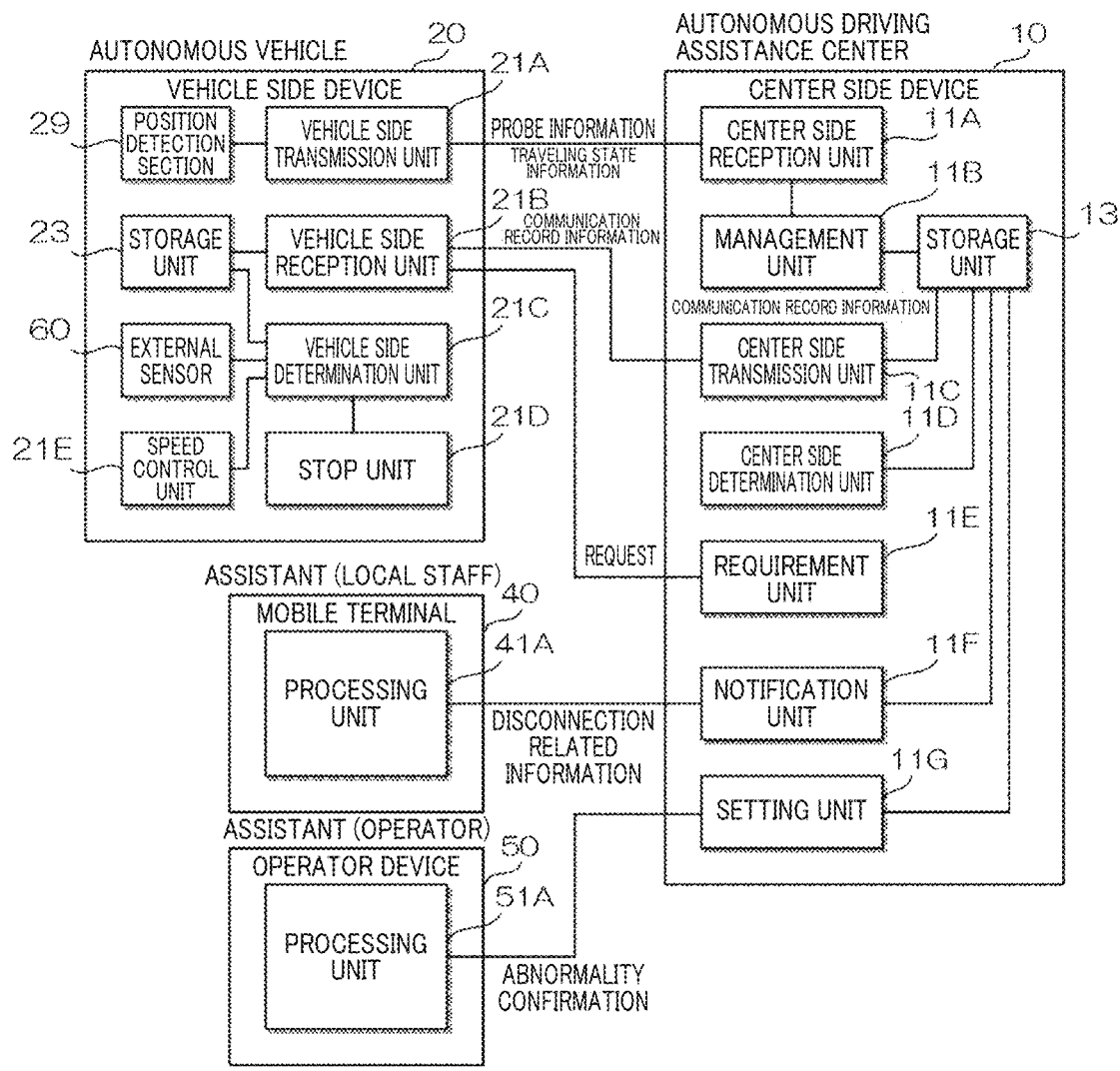
FIG. 20 is a block diagram illustrating an example of a functional configuration of the management system according to the fourth embodiment.

Next, with reference to FIG. 20, functional configurations of the devices included in the management system 90 according to the fourth embodiment will be described. In FIG. 20, the blocks performing processing similar to that of the blocks in FIG. 2 are denoted by the same reference signs as those in FIG. 2 to omit redundant descriptions.

As illustrated in FIG. 20, the management system 90 according to the fourth embodiment differs from the management system 90 according to the first embodiment in that the vehicle side device 20 additionally includes a speed control unit 21E that controls a traveling speed, in a case in which autonomous traveling is continued during a period during which communication with the autonomous driving assistance center is disconnected, so as to be lower than the traveling speed before the period. The management system 90 according to the fourth embodiment differs from the management system 90 according to the first embodiment in that when the center side transmission unit 11C transmits communication record information, the center side transmission unit 11C transmits only information on the last point (location) (hereinafter, referred to as a communication possible predicted point (location)) which is on the traveling route and at which communication is predicted to be possible, based on the traveling location and the traveling route of the autonomous vehicle that is the destination of the communication record information. In addition, the management system 90 according to the fourth embodiment differs from the management system 90 according to the first embodiment in that the vehicle side determination unit 21C determines to continue the autonomous traveling, if the vehicle side expected period Tc is a predetermined period or less and the vehicle side determination unit 21C determines that safe travel can be performed according to a result of sensing by a predetermined sensor (in the present embodiment, the camera and the lidar configuring the external sensor 60).

Next, with reference to FIG. 21, as operation of the center side device 10 according to the fourth embodiment, operation of the center side device 10 in a case in which a communication situation information transmission process is performed will be described. In the communication situation information transmission process illustrated in FIG. 21, steps performing the same processing as that of the communication situation information transmission process illustrated in FIG. 8 are denoted by the same step numbers as those in FIG. 8 to omit redundant descriptions.

Figure 21:
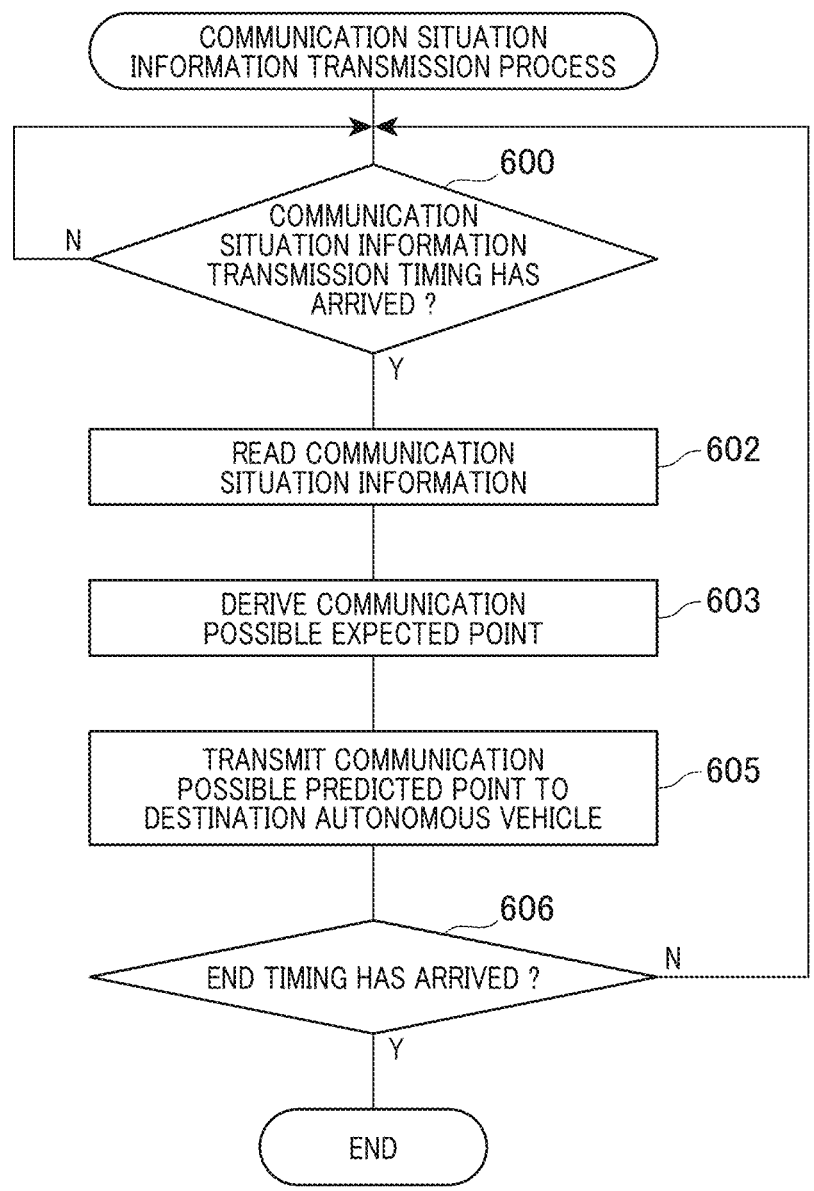
FIG. 21 is a flowchart of an example of a communication situation information transmission process according to the fourth embodiment.

The communication situation information transmission process illustrated in FIG. 21 differs from the communication situation information transmission process illustrated in FIG. 8 in that the processing of step 604 is replaced with processing of step 603 and step 605.

That is, in step 603 in FIG. 21, the center side transmission unit 11C uses the communication situation information read by the processing in step 602 to derive a communication possible predicted point by a method similar to that deriving a communication restoration expected point in the processing of step 704 of the center side communication disconnection process illustrated in FIG. 13. In the next step 605, the center side transmission unit 11C transmits information indicating the derived communication possible predicted point to a destination autonomous vehicle via the communication I/F unit 18 and the network 80.

Next, with reference to FIG. 22, as operation of the vehicle side device 20 according to the fourth embodiment, operation of the vehicle side device 20 in a case in which a communication situation information reception process is performed will be described. In the communication situation information reception process illustrated in FIG. 22, steps performing the same processing as that of the communication situation information reception process illustrated in FIG. 9 are denoted by the same step numbers as those in FIG. 9 to omit redundant descriptions.

Figure 22:
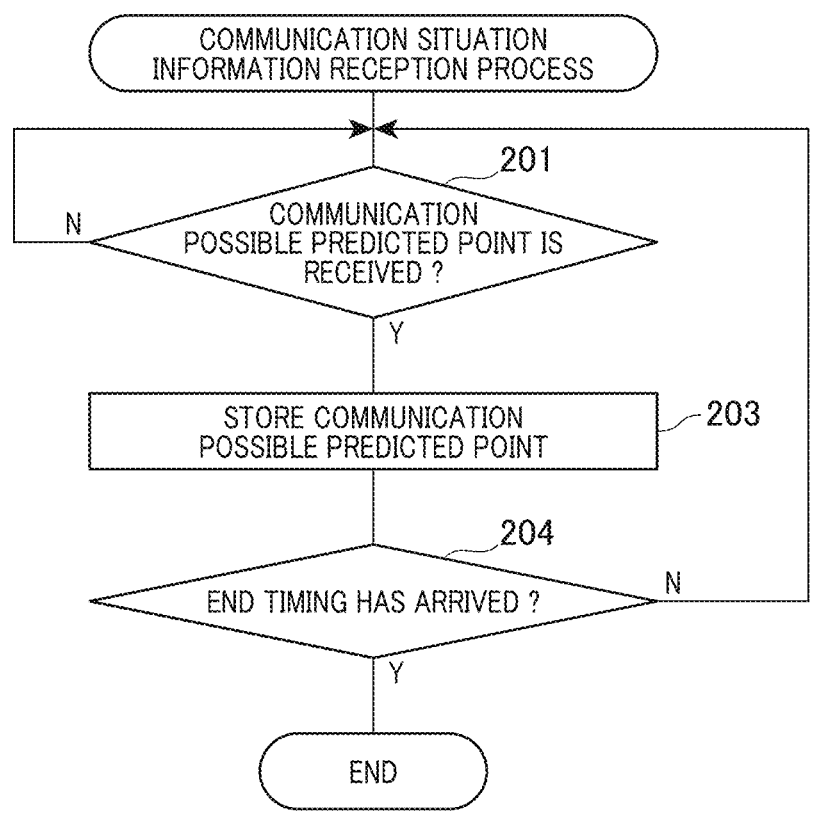
FIG. 22 is a flowchart of an example of a communication situation information reception process according to the fourth embodiment.

The communication situation information reception process illustrated in FIG. 22 differs from the communication situation information reception process illustrated in FIG. 9 in that the processing of step 200 and step 202 is replaced with processing of step 201 and step 203.

That is, in step 201 in FIG. 22, the vehicle side reception unit 21B waits until receiving information indicating a communication possible predicted point from the center side device 10. In next step 203, the vehicle side reception unit 21B stores information indicating the received communication possible predicted point in a predetermined area of the storage unit 23.

Next, with reference to FIG. 23, as operation of the vehicle side device 20 according to the fourth embodiment, operation of the vehicle side device 20 that performs the vehicle side communication disconnection process will be described. In the vehicle side communication disconnection process illustrated in FIG. 23, steps performing the same processing as that of the vehicle side communication disconnection process illustrated in FIG. 10 are denoted by the same step numbers as those in FIG. 10 to omit redundant descriptions.

Figure 23:
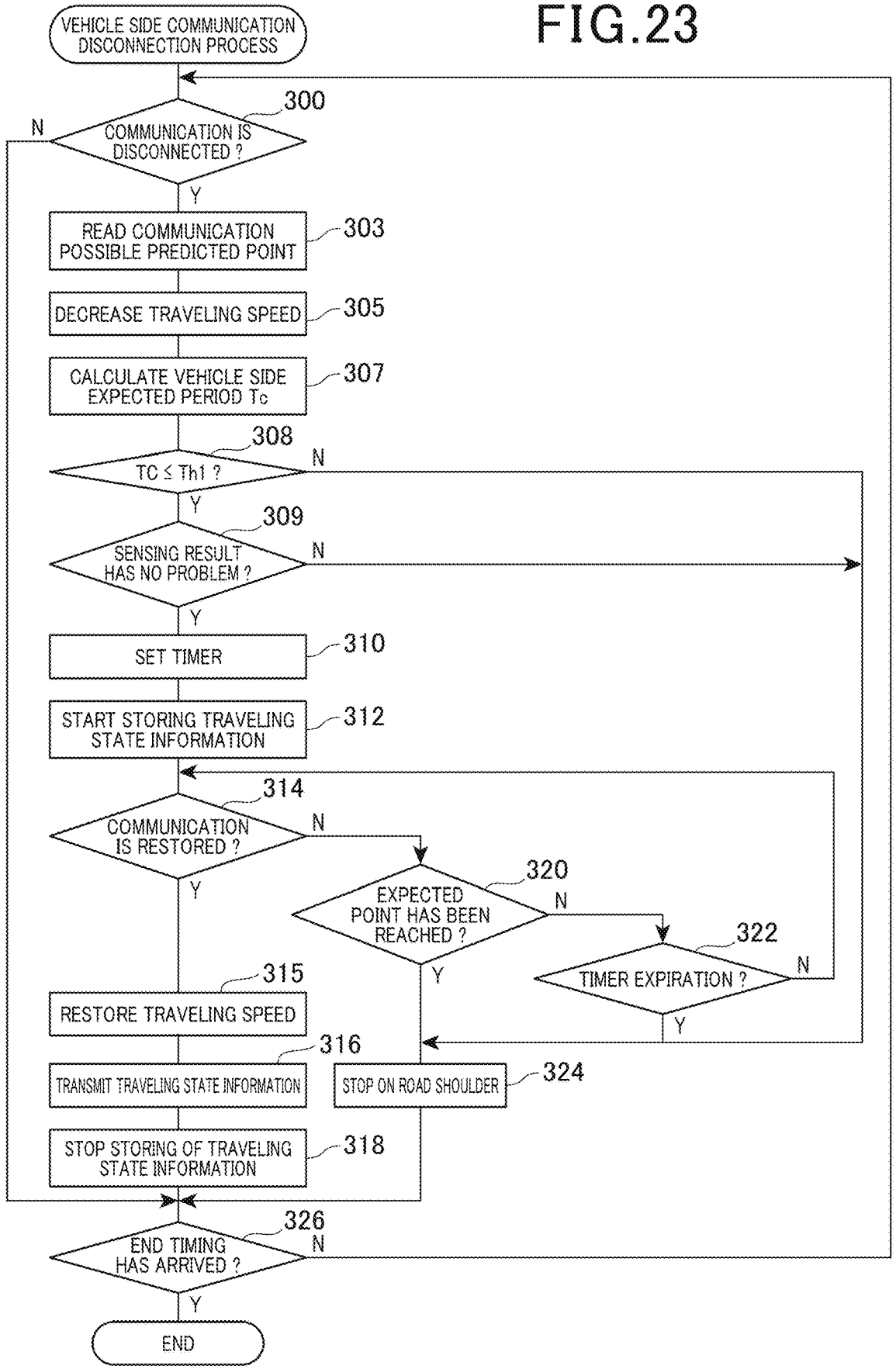
FIG. 23 is a flowchart of an example of a vehicle side communication disconnection process according to the fourth embodiment.

The vehicle side communication disconnection process illustrated in FIG. 23 differs from the vehicle side communication disconnection process illustrated in FIG. 10 in that the processing of step 302, step 304, and step 306 is replaced with processing of step 303, step 305, and step 307. In addition, the vehicle side communication disconnection process illustrated in FIG. 23 differs from the vehicle side communication disconnection process illustrated in FIG. 10 in that step 309 and step 315 are additionally included.

That is, in step 303 in FIG. 23, the vehicle side determination unit 21C reads information indicating the communication possible predicted point stored by the communication situation information reception process described above from the storage unit 23. In next step 305, the speed control unit 21E controls the traveling speed of the own vehicle so as to be decreased by a predetermined speed (as an example, 10 km/h). In next step 307, the vehicle side determination unit 21C sets the communication possible predicted point indicated by the read information to the communication restoration expected point described above and sets the traveling speed decreased in step 305 to the traveling speed Sp to calculate the vehicle side expected period Tc by using the expression (1) as in the first embodiment. In this case, as in the center side device 10, the center side expected period Ts is calculated, assuming that the traveling speed of the processing target vehicle is decreased by a predetermined speed with respect to that before communication is disconnected.

In step 309, the vehicle side determination unit 21C determines whether there is an obstacle, which interferes with travel of the own vehicle, in front of the own vehicle, based on a sensing result of the external sensor 60 to determine whether the sensing result of the external sensor 60 has a problem, that is whether the path to the communication restoration expected point can be passed through by autonomous driving. If a positive determination is made, the process proceeds to step 310. In contrast, if a negative determination is made, the process proceeds to step 324.

Furthermore, in step 315, the speed control unit 21E performs control for restoring the traveling speed of the own vehicle decreased by the processing in step 305 to the original speed.

As described above, according to the present embodiment, when transmitting communication record information, the center side transmission unit 11C transmits only information on the last point which is on the traveling route and at which communication is predicted to be possible, based on the traveling location and the traveling route of the autonomous vehicle that is the destination of the communication record information. Hence, compared with a case in which communication record information itself is transmitted, information on the communication record can be transmitted more effectively.

According to the present embodiment, when determining that the vehicle side expected period Tc is a predetermined period or less and determining that safe travel can be performed according to a result of sensing by a predetermined sensor, the vehicle side determination unit 21C determines to continue the autonomous traveling. Hence, the autonomous traveling can be continued more appropriately.

According to the present embodiment, when the autonomous vehicle continues autonomous traveling during a period in which communication with the autonomous driving assistance center is disconnected, the speed control unit 21E controls a traveling speed so as to be lower than that before the period. Hence, safety of the autonomous traveling can be improved.

In the above embodiments, the management unit 11B, the center side determination unit 11D, the requirement unit 11E, the notification unit 11F, and the setting unit 11G are included in the center side device 10, and the vehicle side determination unit 21C, the stop unit 21D, and the speed control unit 21E are included in the vehicle side device 20. However, this is not a limitation. For example, these units may be included in any of the center side device 10 and the vehicle side device 20 within a range in which corresponding functions can be performed.

Although not described in the above embodiments, in step 718 of the center side communication disconnection process (refer to FIG. 13), when communication with another autonomous vehicle traveling in a communication disconnection section, which is set as unstable area information by the setting unit 11G, is not disconnected, the setting unit 11G may exclude the communication disconnection section from the unstable area information. Thus, occurrence of unnecessary determination can be reduced.

The expressions (1) to (3) according to the above embodiments are examples and may be variously modified. For example, although variable Cp, variable Dp, and variable Ep are added in the expression (3), these variables may be multiplied to calculate the autonomous driving risk value R. The configurations of the units according to the above embodiments are examples and may be modified within a scope not deviating from the gist of the present disclosure. For example, although the above embodiments exemplify each of the center side device 10 and the vehicle side device 20 including an input unit and a display unit, each of the devices may not include the units.

In the above embodiments, for example, as a hardware structure of processing units performing processing of the center side reception unit 11A, the management unit 11B, the center side transmission unit 11C, the center side determination unit 11D, the requirement unit 11E, the notification unit 11F, the setting unit 11G, the vehicle side transmission unit 21A, the vehicle side reception unit 21B, the vehicle side determination unit 21C, the stop unit 21D, the speed control unit 21E, the following various processors may be used. The various processors include, as described above, in addition to a CPU that is a general-purpose processor that executes software (program) to function as a processing unit, a programmable logic device (PLD), such as a field-programmable gate array (FPGA), which is a processor whose circuit configuration can be modified, and a dedicated electric circuit, such as an application specific integrated circuit (ASIC), which is a processor having a circuit configuration specifically designed for performing a specific process.

The processing unit may be configured by one of the various processors or a combination of two or more of the same or different kind of processors (e.g., a combination of a plurality of FPGAs or a combination of a CPU and an FPGA). The processing unit may be configured by one processor.

A first example of the processing unit configured by one processor is, as represented by a computer such as a client server, one processor configured by a combination of one or more CPU and software, the processor functioning as the processing unit. A second example of the processing unit configured by one processor is, as represented by a system on chip (SoC), a processor implementing functions of the whole system including the processing unit by one integrated circuit (IC) chip. As described above, the processing unit is configured by using one or more of the above various processors, as a hardware configuration.

In addition, as hardware configurations of the above various processors, more specifically, an electric circuit (circuitry) configured by combing circuit elements such as a semiconductor device may be used.

The present disclosure has so far been described based on some embodiments. However, the present disclosure should not be construed as being limited to these embodiments or the structures. The present disclosure should encompass various modifications, or modifications within the range of equivalence. In addition, various combinations and modes, as well as other combinations and modes, including those which include one or more additional elements, or those which include fewer elements should be construed as being within the scope and spirit of the present disclosure.

As an aspect of the present disclosure, a management system (90) is provided in which an autonomous driving assistance center periodically communicates with an autonomous vehicle, which is automatically driven, to manage a vehicle state of the autonomous vehicle. The system includes: a vehicle side device (20) provided to the autonomous vehicle and including a vehicle side determination unit (21C) that determines, when communication with the autonomous driving assistance center is disconnected, whether to continue autonomous traveling, based on communication situation information that indicates a situation of communication between the autonomous driving assistance center and the autonomous vehicle at each place, where the autonomous vehicle is allowed to travel, in a management target area of the management system; and a center side device (10) provided to the autonomous driving assistance center and including a center side determination unit (11D) that determines, when the communication with the autonomous vehicle is disconnected, whether to notify an assistant assisting the autonomous vehicle, based on the communication situation information. The vehicle side determination unit derives a vehicle side expected period, which is a period within which disconnected communication is expected to be restored, based on a traveling route of the autonomous vehicle to which the vehicle side determination unit is provided and the communication situation information. If the derived vehicle side expected period is a predetermined period or less, the vehicle side determination unit determines to continue the autonomous traveling.

As another aspect of the present disclosure, a management method is provided which is used in a management system in which an autonomous driving assistance center periodically communicates with an autonomous vehicle, which is automatically driven, to manage a vehicle state of the autonomous vehicle. The method includes the step of: determining, when communication between the autonomous driving assistance center and the autonomous vehicle is disconnected, whether to continue autonomous traveling and whether to notify an assistant assisting the autonomous vehicle, based on communication situation information that indicates a situation of communication between the autonomous driving assistance center and the autonomous vehicle at each place, where the autonomous vehicle is allowed to travel, in a management target area of the management system. The step of determining derives a vehicle side expected period, which is a period within which disconnected communication is expected to be restored, based on a traveling route of the autonomous vehicle and the communication situation information, and determines to continue the autonomous traveling if the derived vehicle side expected period is a predetermined period or less.

As another aspect of the present disclosure, a storage medium is provided in which a management program used in a management system in which an autonomous driving assistance center periodically communicates with an autonomous vehicle, which is automatically driven, to manage a vehicle state of the autonomous vehicle is stored to cause a computer to execute processing. The processing includes the step of: determining, when communication between the autonomous driving assistance center and the autonomous vehicle is disconnected, whether to continue autonomous traveling and whether to notify an assistant assisting the autonomous vehicle, based on communication situation information that indicates a situation of communication between the autonomous driving assistance center and the autonomous vehicle at each place, where the autonomous vehicle is allowed to travel, in a management target area of the management system. The step of determining derives a vehicle side expected period, which is a period within which disconnected communication is expected to be restored, based on a traveling route of the autonomous vehicle and the communication situation information, and determines to continue the autonomous traveling if the derived vehicle side expected period is a predetermined period or less.

The management system, the management method, and the storage medium according to the present disclosure can prevent continuity of an autonomous driving assistance service from being reduced and prevent the cost of the autonomous driving assistance service from increasing.

What is claimed is:

1. A management system in which an autonomous driving assistance center periodically communicates with an autonomous vehicle, which is automatically driven, to manage a vehicle state of the autonomous vehicle, the system comprising:
   a vehicle side device provided to the autonomous vehicle and including a vehicle side determination unit that determines, when communication with the autonomous driving assistance center is disconnected, whether to continue autonomous traveling, based on communication situation information that indicates a situation of communication between the autonomous driving assistance center and the autonomous vehicle at each place, where the autonomous vehicle is allowed to travel, in a management target area of the management system; and
   a center side device provided to the autonomous driving assistance center and including a center side determination unit that determines, when the communication with the autonomous vehicle is disconnected, whether to notify an assistant assisting the autonomous vehicle, based on the communication situation information, wherein
   the vehicle side determination unit derives a vehicle side expected period, which is a period within which disconnected communication is expected to be restored, based on a traveling route of the autonomous vehicle to which the vehicle side determination unit is provided and the communication situation information,
   if the derived vehicle side expected period is a predetermined period or less, the vehicle side determination unit determines to continue the autonomous traveling, and
   the vehicle side device is configured to stop the autonomous traveling in response to determination that the derived vehicle side expected period is outside the predetermined period.

2. The management system according to claim 1, wherein the vehicle side device further includes a vehicle side transmission unit that transmits probe information including location information indicating a traveling location of the autonomous vehicle to the center side device,
   the center side device further includes:
   a center side reception unit that receives the probe information transmitted from the vehicle side transmission unit;
   a management unit that manages location information, which is included in the probe information received by the center side reception unit, as communication record information indicating success in communication; and
   a center side transmission unit that transmits the communication record information managed by the management unit to the vehicle side device, and
   the communication situation information includes the communication record information.

3. The management system according to claim 2, wherein when transmitting the communication record information, the center side transmission unit transmits only information on a last point that is on the traveling route and at which communication is predicted to be possible, based on the traveling location and the traveling route of the autonomous vehicle.

4. The management system according to claim 1, wherein the communication situation information includes unstable area information that indicates an area which is capable of being determined from geographical information in the management target area and in which communication is unstable between the autonomous driving assistance center and the autonomous vehicle.

5. The management system according to claim 1, wherein if the vehicle side expected period is the predetermined period or less and the vehicle side determination unit determines that safe travel is capable of being performed according to a result of sensing by a predetermined sensor, the vehicle side determination unit determines to continue the autonomous traveling.

6. The management system according to claim 1, wherein instead of determining to continue the autonomous traveling if the derived vehicle side expected period is the predetermined period or less, if a degree of necessity of assistance from the autonomous driving assistance center on a path to a point where restoration of disconnected communication is expected is a predetermined level or less, the vehicle side determination unit determines to continue autonomous traveling based on the traveling route of the autonomous vehicle to which the vehicle side determination unit is provided and the communication situation information.

7. The management system according to claim 6, wherein if the path is a path having no crosswalk, a path that is a road on which pedestrians and vehicles are separated, or a path having no passenger platform, the vehicle side determination unit determines that the degree of the necessity of the assistance is the predetermined level or less.

8. The management system according to claim 1, wherein if the derived vehicle side expected period is the predetermined period or less, and a degree of necessity of assistance on a path to a point where restoration of the disconnected communication is expected is a predetermined level or less, the vehicle side determination unit determines to continue the autonomous traveling based on the traveling route and the communication situation information.

9. The management system according to claim 1, wherein the vehicle side device further includes a stop unit that stops the autonomous traveling when the autonomous traveling is continued in a state in which the communication is disconnected, and the communication is not restored even when the autonomous vehicle has reached a point where restoration of the communication is expected.

10. The management system according to claim 1, wherein the center side determination unit derives a center side expected period, which is a period within which disconnected communication is expected to be restored, based on the traveling route of the autonomous vehicle on which communication is disconnected and the communication situation information, and if the derived center side expected period is a predetermined period or less, the center side determination unit determines not to notify the assistant.

11. The management system according to claim 10, wherein when communication with the autonomous vehicle is not restored even if the center side expected period has elapsed, the center side determination unit determines to notify the assistant.

12. The management system according to claim 11, wherein the center side device further includes a notification unit, wherein when the center side determination unit determines not to notify the assistant, and thereafter determines to notify the assistant, the notification unit notifies the assistant of disconnection related information including at least one of a point where communication with the autonomous vehicle is disconnected and a path that is considered that the autonomous vehicle has traveled thereon during a period during which the communication is disconnected.

13. The management system according to claim 1, wherein the vehicle side device further includes a speed control unit that controls a traveling speed, in a case in which the autonomous vehicle continues autonomous traveling during a period during which communication with the autonomous driving assistance center is disconnected, so as to be lower than the traveling speed before the period.

14. The management system according to claim 1, wherein the center side device further includes a requirement unit, wherein when the disconnected communication with the autonomous vehicle is restored, the requirement unit requests the autonomous vehicle to transmit traveling state information indicating a traveling state of the autonomous vehicle during a period during which the communication is disconnected.

15. The management system according to claim 14, wherein the center side device further includes a setting unit, wherein the setting unit causes the assistant to confirm whether the traveling state indicated by the traveling state information obtained from the autonomous vehicle in response to the request by the requirement unit is abnormal, and if the traveling state is not abnormal, the setting unit incorporates a communication disconnection section, in which the autonomous vehicle has traveled during the period during which the communication is disconnected, into an unstable area information indicating an area in which communication is unstable between the autonomous driving assistance center and the autonomous vehicle.

16. The management system according to claim 15, wherein the setting unit exclude the communication disconnection section from the unstable area information, when communication with another autonomous vehicle traveling in the communication disconnection section is not disconnected.

17. The management system according to claim 15, wherein only when the traveling state is expected to be abnormal, the setting unit causes the assistant to confirm whether the traveling state indicated by the traveling state information is abnormal.

18. A management method used in a management system in which an autonomous driving assistance center periodically communicates with an autonomous vehicle, which is automatically driven, to manage a vehicle state of the autonomous vehicle, the method comprising:

determining, when communication between the autonomous driving assistance center and the autonomous vehicle is disconnected, whether to continue autonomous traveling and whether to notify an assistant assisting the autonomous vehicle, based on communication situation information that indicates a situation of communication between the autonomous driving assistance center and the autonomous vehicle at each place, where the autonomous vehicle is allowed to travel, in a management target area of the management system, wherein determining whether to continue autonomous traveling and whether to notify an assistant assisting the autonomous vehicle further comprises deriving a vehicle side expected period, which is a period within which disconnected communication is expected to be restored, based on a traveling route of the autonomous vehicle and the communication situation information, and determines to continue the autonomous traveling if the derived vehicle side expected period is a predetermined period or less, and the autonomous traveling is stopped in response to determining that the derived vehicle side expected period is outside the predetermined period.

19. The management method according to claim 18, further comprising:

determining to continue the autonomous traveling, if the vehicle side expected period is the predetermined period or less and it is determined that safe travel is capable of being performed according to a result of sensing by a predetermined sensor.

20. The management method according to claim 18, further comprising:

deriving a center side expected period, which is a period within which disconnected communication is expected to be restored, based on the traveling route of the autonomous vehicle and the communication situation information, and determining not to notify the assistant if the derived center side expected period is a predetermined period or less.

21. The management method according to claim 20, further comprising:

determining to notify the assistant when the communication with the autonomous vehicle is not restored even if the center side expected period has elapsed.

22. A non-transitory storage medium in which a management program used in a management system in which an autonomous driving assistance center periodically communicates with an autonomous vehicle, which is automatically driven, to manage a vehicle state of the autonomous vehicle is stored to cause a computer to execute processing, the processing comprising:

determining, when communication between the autonomous driving assistance center and the autonomous vehicle is disconnected, whether to continue autonomous traveling and whether to notify an assistant assisting the autonomous vehicle, based on communication situation information that indicates a situation of communication between the autonomous driving assistance center and the autonomous vehicle at each place, where the autonomous vehicle is allowed to travel, in a management target area of the management system, wherein determining whether to continue autonomous traveling and whether to notify an assistant assisting the autonomous vehicle further comprises deriving a vehicle side expected period, which is a period within which disconnected communication is expected to be restored, based on a traveling route of the autonomous vehicle and the communication situation information, and determines to continue the autonomous traveling if the derived vehicle side expected period is a predetermined period or less, wherein the autonomous traveling is stopped in response to determining that the derived vehicle side expected period is outside the predetermined period.

* * * * *